United States Patent
Kim et al.

(10) Patent No.: US 7,116,061 B2
(45) Date of Patent: Oct. 3, 2006

(54) BRIGHTNESS CONTROLLABLE FLASHLIGHTS

(75) Inventors: Paul Y. Kim, Santa Ana, CA (US); William A. Hunt, Foothill Ranch, CA (US)

(73) Assignee: Surefire, LLC, Fountain Valley, CA (US)

( * ) Notice: Subject to any disclaimer, the term of this patent is extended or adjusted under 35 U.S.C. 154(b) by 20 days.

(21) Appl. No.: 10/966,426

(22) Filed: Oct. 14, 2004

(65) Prior Publication Data

US 2005/0077837 A1     Apr. 14, 2005

Related U.S. Application Data

(63) Continuation-in-part of application No. 10/346,537, filed on Jan. 16, 2003, now Pat. No. 6,841,941.

(51) Int. Cl.
*F21L 4/00* (2006.01)
(52) U.S. Cl. .................. 315/200 A; 315/82; 315/291; 307/126; 307/112
(58) Field of Classification Search .............. 315/200, 315/82
See application file for complete search history.

(56) References Cited

U.S. PATENT DOCUMENTS

| | | |
|---|---|---|
| 1,214,583 A | 2/1917 | Persons |
| 1,226,325 A | 5/1917 | Geromanos |
| 1,287,611 A | 12/1918 | Barnes |
| 1,361,557 A | 12/1920 | Wheat |
| 1,423,911 A | 7/1922 | Cardwell |
| 1,448,352 A | 3/1923 | Barany et al. |
| 1,559,930 A | 11/1925 | Bean |
| 1,889,936 A | 12/1932 | Shannon |
| 2,097,222 A | 10/1937 | Thomkins et al. |
| 2,190,035 A | 2/1940 | Loungway |
| 2,408,643 A | 10/1946 | Hoy |
| 2,443,539 A | 6/1948 | Kopp |

(Continued)

OTHER PUBLICATIONS

NiteRider Digital Explorer Instruction Manual, Mar. 3, 1998.

(Continued)

*Primary Examiner*—Don Wong
*Assistant Examiner*—Binh Van Ho
(74) *Attorney, Agent, or Firm*—David Weiss

(57) ABSTRACT

Flashlights having selectively controllable brightness levels, a preferred embodiment of which comprises in combination: a battery; a light emitter assembly; a switch in circuit with the battery and the light emitter assembly, the switch having a first OFF position and a second OFF position, the first ON position coupling the battery to the light emitter assembly for producing a first light output, and a second ON position coupling the battery to the light emitter assembly for producing a second light output; and a switch actuator adapted to be coupled to the switch alternatively in its first OFF position and its second OFF position, the switch actuator when coupled in its first OFF position is translatable by a first distance placing the switch in its first ON position and translatable by a second distance placing the switch in its second ON position, the switch actuator when coupled in its second OFF position is translatable by a third distance placing the switch in its first ON position. The switch actuator preferably comprises a click-ON/click-OFF pushbutton switch actuator, for alternatively placing the switch momentarily in its first and second ON positions and constantly in its second ON position from its first OFF position; and for alternatively placing the switch momentarily and constantly in its first ON position from its second OFF position.

51 Claims, 12 Drawing Sheets

U.S. PATENT DOCUMENTS

| | | | |
|---|---|---|---|
| 3,596,078 A | 7/1971 | Owens | |
| 3,999,193 A | 12/1976 | Hasegawa | |
| 4,025,743 A * | 5/1977 | Oswald | 200/60 |
| 4,135,230 A | 1/1979 | Armbruster | |
| 4,211,955 A | 7/1980 | Ray | |
| 4,230,921 A | 10/1980 | Wearing et al. | |
| 4,249,234 A | 2/1981 | Park et al. | |
| 4,286,311 A | 8/1981 | Maglica | |
| 4,290,095 A | 9/1981 | Schmidt | |
| 4,319,106 A | 3/1982 | Armitage | |
| 4,332,445 A | 6/1982 | Hosono | |
| 4,346,329 A | 8/1982 | Schmidt | |
| 4,386,391 A | 5/1983 | Gulliksen et al. | |
| 4,388,673 A | 6/1983 | Maglica | |
| 4,463,231 A | 7/1984 | Cooper et al. | |
| 4,484,253 A | 11/1984 | Roberts | |
| 4,499,525 A | 2/1985 | Mallory | |
| 4,506,124 A | 3/1985 | Rose et al. | |
| 4,527,223 A | 7/1985 | Maglica | |
| 4,530,034 A | 7/1985 | Kawarada | |
| 4,581,686 A | 4/1986 | Nelson | |
| 4,605,993 A | 8/1986 | Zelina, Jr. | |
| 4,677,533 A | 6/1987 | McDermott et al. | |
| 4,733,337 A | 3/1988 | Bieberstein | |
| 4,758,694 A | 7/1988 | Burdick | |
| 4,760,504 A | 7/1988 | Schaller et al. | |
| 4,783,725 A | 11/1988 | Schaller et al. | |
| 4,788,633 A | 11/1988 | Zimmermann et al. | |
| 4,803,605 A | 2/1989 | Schaller et al. | |
| 4,841,417 A | 6/1989 | Maglica et al. | |
| 4,876,416 A | 10/1989 | Frantz et al. | |
| 4,914,555 A | 4/1990 | Gammache | |
| 4,947,291 A | 8/1990 | McDermott | |
| 4,963,798 A | 10/1990 | McDermott | |
| 4,985,813 A | 1/1991 | Putman | |
| 5,003,440 A | 3/1991 | Maglica | |
| 5,077,644 A | 12/1991 | Schaller et al. | |
| 5,081,568 A | 1/1992 | Dong et al. | |
| 5,161,879 A | 11/1992 | McDermott | |
| 5,174,648 A | 12/1992 | Clary et al. | |
| 5,345,370 A | 9/1994 | Murray et al. | |
| 5,359,779 A | 11/1994 | Polk et al. | |
| 5,424,927 A * | 6/1995 | Schaller et al. | 362/157 |
| 5,590,951 A | 1/1997 | Matthews | |
| 5,629,105 A | 5/1997 | Matthews | |
| 5,642,932 A | 7/1997 | Matthews | |
| 5,685,637 A | 11/1997 | Chapman et al. | |
| 5,722,755 A | 3/1998 | Slape | |
| 5,727,675 A | 3/1998 | Leveque et al. | |
| 5,821,697 A | 10/1998 | Weber | |
| 5,871,272 A | 2/1999 | Sharrah et al. | |
| 5,984,494 A | 11/1999 | Chapman et al. | |
| 6,019,482 A | 2/2000 | Everett | |
| 6,046,572 A | 4/2000 | Matthews et al. | |
| 6,095,661 A | 8/2000 | Lebens et al. | |
| 6,183,105 B1 | 2/2001 | Parker | |
| 6,260,985 B1 * | 7/2001 | Zeller | 362/202 |
| 6,296,367 B1 | 10/2001 | Parsons et al. | |
| 6,386,730 B1 | 5/2002 | Matthews | |
| RE38,014 E | 3/2003 | Bieberstein | |
| 6,742,911 B1 * | 6/2004 | Chen | 362/206 |
| 6,808,287 B1 * | 10/2004 | Lebens et al. | 362/184 |
| 6,890,086 B1 * | 5/2005 | Shiu | 362/251 |
| 6,942,356 B1 * | 9/2005 | Hahn | 362/125 |

OTHER PUBLICATIONS

Microchip Technology Inc., Data Sheet PIC12C67X, 1999.
International Rectifier, Data Sheet IRL3803S/L, Aug. 25, 1997.
National Semiconductor, Data Sheet LP2950/LP2951, Jul. 2000.
William Hunt, "Pulse Width Modulated Voltage Regulator for Electric Caving Lamps", Apr. 12, 1995.
William Hunt, "Willie Hunt's Lightbulb Voltage Regulators", prior to Dec. 1, 2001.

* cited by examiner

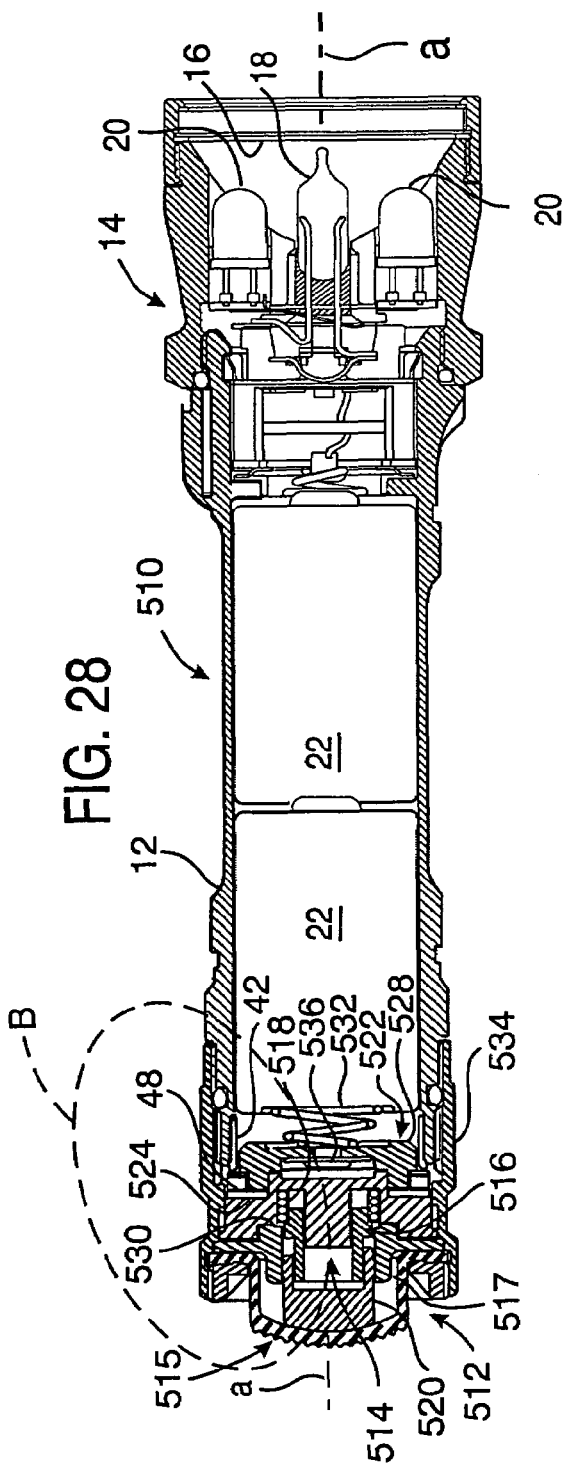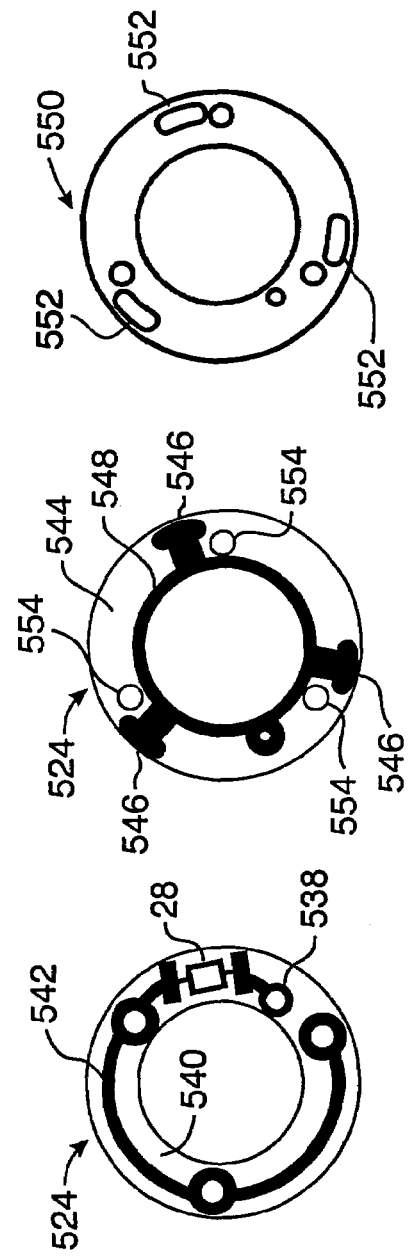
FIG. 28
FIG. 29
FIG. 30
FIG. 31

US 7,116,061 B2

BRIGHTNESS CONTROLLABLE FLASHLIGHTS

CROSS REFERENCE TO RELATED APPLICATION

This application is a continuation-in-part of U.S. patent application Ser. No. 10/346,537, filed Jan. 16, 2003 now U.S. Pat. No. 6,841,941, which application is incorporated herein by reference.

FIELD OF THE INVENTION

This invention relates to flashlights, and more particularly to flashlights with selectably controllable brightness levels.

BACKGROUND OF THE INVENTION

Handheld flashlights with selectably actuable brightness levels are known in the prior art, as are flashlights with multiple light emitters including incandescent light bulbs and light emitting diodes. Such flashlights permit a user to perform tasks under portable light conditions selected for the particular task. Nevertheless, the need exists for improvements in such flashlights for increasing their adaptability to varied environments and purposes.

SUMMARY OF THE INVENTION

In accordance with a principal aspect of the present invention, flashlights with at least two user-selectable brightness levels are provided, the brightness level and its selection being in response to manual actuation of a switch which is preferably situated in the flashlight's tail cap.

Preferred embodiments of the invention provide, in a flashlight, the combination comprising: a battery; a switch having an OFF position not connected to the battery, a first ON position connected to the battery, and a second ON position connected to the battery; an electrical component in circuit with the battery when the switch is in its first ON position and not in circuit with the battery when the switch is in its second ON position; a light emitter assembly; and a controller in circuit with the battery, the switch and the light emitter assembly, for detecting whether or not the electrical component is in circuit with the battery when the switch is in either one of its first ON position and its second ON position, and for controlling electrical power to the light emitter assembly for producing a first light output when the electrical component is detected and for producing a second light output when the electrical component is not detected. The controller preferably also regulates power to the light emitter assembly for providing constant brightness of at least one of the first and second light outputs. The controller, in one preferred aspect of the invention, abruptly reduces power to the light emitter assembly when the battery is near exhaustion, abruptly reducing light output of the light emitter assembly, for signaling that the battery is near exhaustion and for facilitating battery replacement.

The flashlight includes a switch actuator for placing the switch alternatively in its OFF position, its first ON position and its second ON position. The actuator preferably includes a pushbutton depressible by a first distance placing the switch in its first ON position and depressible by a second distance placing the switch in its second ON position.

The electrical component in circuit with the battery, and which presence is detected by the controller for determining switch position, may comprise a resistor or an inductor in circuit with the battery when the switch is in its first ON position and is shorted out of the circuit when the switch is in its second ON position.

In one preferred embodiment according to the present invention, the light emitter assembly includes an incandescent lamp connected to the controller and at least one light emitting diode (LED) connected to the battery through the switch, the at least one LED being powered by the battery for producing light output when the switch is in its first ON position, the controller delivering power to the incandescent lamp for producing light output when the switch is in its second ON position but not when the switch is in its first ON position. The at least one LED may be powered by the battery for producing light output when the switch is in its second ON position as well as when the switch is in its first ON position.

In a second preferred flashlight embodiment, the light emitter assembly includes an incandescent lamp connected to the controller, the controller delivering power to the incandescent lamp for producing the first light output when the switch is in its first ON position and for producing the second light output when the switch is in its second ON position.

In a third preferred flashlight embodiment, the light emitter assembly includes two incandescent lamps connected to the controller, the controller delivering power to one of the incandescent lamps for producing light output when the switch is in its first ON position, the controller delivering power to the other of the incandescent lamps (or to both of the incandescent lamps) for producing light output when the switch is in its second ON position.

In a yet another preferred flashlight embodiment, the light emitter assembly includes an LED connected to the controller, the controller controlling power to the LED for producing the first light output when the switch is in its first ON position and for producing the second light output when the switch is in its second ON position.

Preferably, in each of the above-mentioned preferred flashlight embodiments, the flashlight includes a battery housing for the battery, with the light emitter assembly situated at the front end of the battery housing; and a tail cap assembly is coupled to the battery housing at its rear end, the tail cap assembly including the switch and the electrical component. The controller, which is preferably situated at the battery housing's front end in proximity to the light emitter assembly, communicates with the tail cap switch and with the electrical component through a conductive path along the battery housing. The tail cap assembly includes a switch actuator, preferably a pushbutton depressible by a first distance placing the switch in its first ON position and depressible by a second distance placing the switch in its second ON position.

In a preferred embodiment of the tail cap switch, a contact member is coupled through the electrical component to the rear terminal of the battery in the battery housing, the contact member including at least one resilient arm spaced from the conductive rear edge of the battery housing when the switch is in its OFF position, the resilient arms being in conductive contact with the battery housing's conductive rear edge when the switch is in its first ON position, the resilient arms being in conductive contact with the battery housing's conductive rear edge and with the rear terminal of the battery shorting out the electrical component when the switch is in its second ON position. The flashlight includes a switch actuator in the tail cap assembly, preferably provided by a pushbutton depressible by a first distance for urging the contact member's resilient arms in conductive contact with the conductive rear edge of the battery housing, and for placing the conductive member's resilient arms in conductive contact with the conductive rear edge of the battery housing and with the rear terminal of the battery shorting out the electrical component.

Another aspect of the present invention provides, in a flashlight, the combination comprising: a battery; a switch having an OFF position not connected to the battery, a first ON position connected to the battery, and a second ON position connected to the battery; a light emitter assembly; a controller in circuit with the battery, the switch and the light emitter assembly, such controller controlling electrical power to the light emitter assembly for producing a first light output when the switch is in its first ON position and for producing a second light output when the switch is in its second ON position; and a switch actuator coupled to the switch and translatable by a first distance placing the switch in its first ON position and translatable by a second distance placing the switch in its second ON position. The switch actuator preferably includes a pushbutton depressible by such first distance placing the switch in its first ON position and depressible by such second distance placing the switch in its second ON position.

A further aspect of the present invention includes a method of indicating near exhaustion of the battery in a flashlight including a light emitter, the method comprising: regulating power from the battery to the light emitter for providing constant brightness of light output over time; detecting near exhaustion of the battery; abruptly reducing power to the light emitter for providing an abrupt decrease in light output when near exhaustion of the battery is detected; and, preferably, regulating the reduced power to the light emitter for providing constant brightness of the decreased light output. During the first regulating step, the method periodically corrects duty cycle for maintaining the constant brightness of light output over time; and during the detecting step, the method detects when the duty cycle is at a predetermined level (such as near 100%) corresponding to near exhaustion of the battery. During the reducing step, the light output is abruptly reduced to approximately 20% of the light output provided during the regulating step.

Other preferred embodiments of the invention provide, in a flashlight, the combination comprising: a battery; a light emitter assembly; a switch in circuit with the battery and the light emitter assembly, the switch having a first OFF position and a second OFF position, a first ON position coupling the battery to the light emitter assembly for producing a first light output, and a second ON position coupling the battery to the light emitter assembly for producing a second light output; and a switch actuator adapted to be coupled to the switch alternatively in the first OFF position and the second OFF position, the switch actuator when coupled in the first OFF position is translatable by a first distance placing the switch in its first ON position and translatable by a second distance placing the switch in its second ON position, the switch actuator when coupled in the second OFF position is translatable by a third distance placing the switch in its first ON position. The flashlight preferably includes a third OFF position, and the switch actuator is adapted to be coupled to the switch in the third OFF position wherein actuation of the switch actuator is ineffective for placing the switch in either of its first and second ON positions.

The switch actuator preferably includes a pushbutton depressible by the first, second and third distances for respectively placing the switch in its first ON, second ON and first ON positions. Preferably, the switch actuator comprises a click-ON/click-OFF pushbutton switch actuator for maintaining the switch in its second ON position when the switch actuator is coupled to the switch in its first OFF position and the pushbutton is depressed to its full travel and released. The click-ON/click-OFF pushbutton switch actuator maintains the switch in its first ON position when the switch actuator is coupled to the switch in its second OFF position and the pushbutton is depressed to its full travel and released.

In another preferred embodiment of the flashlight employing a click-ON/click-OFF pushbutton switch actuator, the flashlight includes the combination comprising: a battery; a light emitter assembly; a switch in circuit with the battery and the light emitter assembly, the switch having a first OFF position, a first ON position coupling the battery to the light emitter assembly for producing a first light output, and a second ON position coupling the battery to the light emitter assembly for producing a second light output; and a click-ON/click-OFF pushbutton switch actuator including a pushbutton, the switch actuator adapted to be coupled to the switch in its first OFF position wherein the pushbutton is depressible by a first distance placing the switch momentarily in the first ON position, the pushbutton is depressible by a second distance placing the switch momentarily in the second ON position, the pushbutton is depressible to its full travel and releasable for maintaining the switch in its second ON position, the switch actuator is adapted for releasing the switch to its first OFF position when the switch is in the maintained second ON position and the pushbutton is depressed to its full travel and released.

In such flashlights, the switch may also include a second OFF position; and the switch actuator is adapted to be coupled to the switch in its second OFF position wherein the pushbutton is depressible by a third distance placing the switch momentarily in the first ON position, the pushbutton is depressible to its full travel and releasable for maintaining the switch in the first ON position, the switch actuator is adapted for releasing the switch to its second OFF position when the switch is in the maintained first ON position and the pushbutton is depressed to its full travel and released.

The switch may also include a third OFF position, and the switch actuator is adapted to be coupled to the switch in the third OFF position wherein depression of the pushbutton is ineffective for placing the switch in either of the first and second ON positions.

BRIEF DESCRIPTION OF THE DRAWINGS

The novel features believed to be characteristic of the invention, together with further advantages thereof, will be better understood from the following description considered in connection with the accompanying drawings in which preferred embodiments of the present invention are illustrated by way of example. It is to be expressly understood, however, that the drawings are for the purpose of illustration and description only and are not intended as a definition of the limits of the invention.

FIG. 28 is a side generally cross-sectional view of the flashlight of FIG. 1 but configured with an alternative tail cap assembly embodiment;

FIG. 29 is a view of the rear face of an example of a circuit board included in the tail cap assembly of FIG. 28, the circuit board shown in increased scale;

FIG. 30 is a view of the front face of the circuit board of FIG. 29;

FIG. 31 is a front view of a solder mask applied to the circuit board front face shown in FIG. 30;

DETAILED DESCRIPTION OF THE PREFERRED EMBODIMENTS

Figure 1:
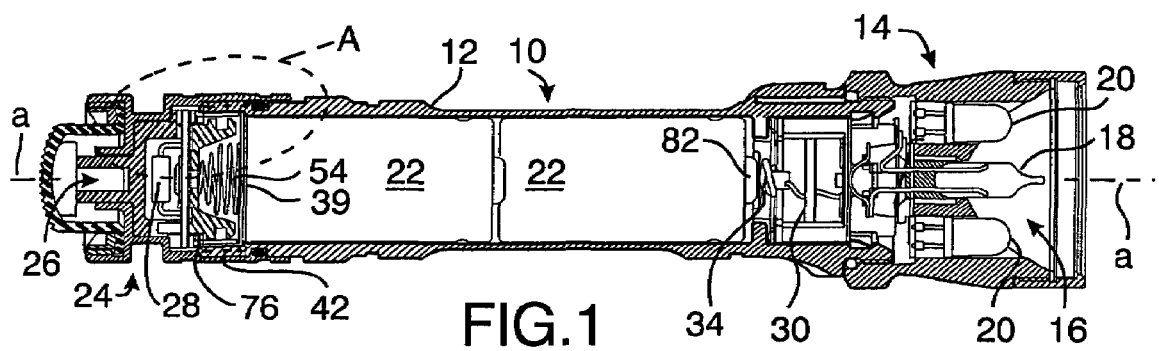
FIG. 1 is a side generally cross-sectional view of a first preferred embodiment of a flashlight apparatus according to the present invention.

Turning to FIG. 1, there is shown a preferred embodiment of a flashlight 10 according to the present invention, which may be conveniently held in the hand of a user. The flashlight 10 includes a generally cylindrical battery housing 12, a head 14 at the flashlight's front end including a light emitter assembly 16 with an incandescent lamp 18 and at least one light emitting diode (LED) 20 in electrical circuit with one or more battery cells 22 in the battery housing 12. A rear or tail cap assembly 24 includes a switch assembly 26 for actuating the circuit to energize the light emitter assembly 16 for producing two levels of brightness. Flashlights including two or more light emitters with tail cap actuation of switching devices for effecting two or more brightness levels are disclosed in U.S. Pat. Nos. 5,629,105 and 6,386,730, issued to John W. Matthews and owned by the assignee of the present invention, the disclosures of which patents are incorporated herein by reference.

Figure 2:
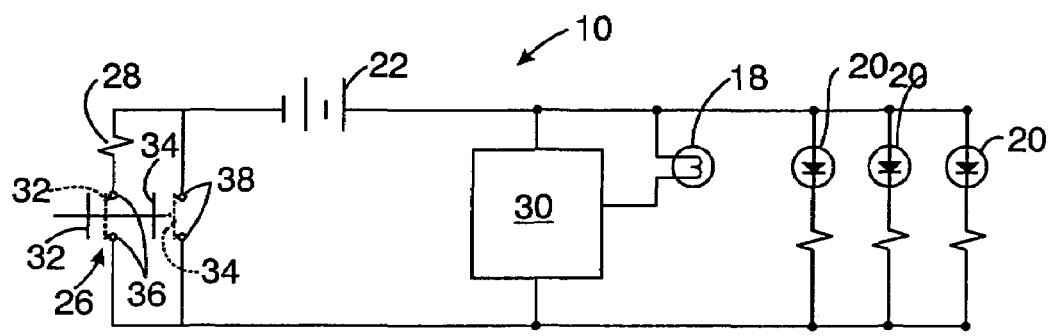
FIG. 2 is a schematic diagram of the flashlight of FIG. 1.

In accordance with the present invention and considering FIG. 2, the tail cap assembly 24 includes an electrical component—such as the resistor 28 shown in the preferred flashlight embodiment of FIG. 1—which may be placed alternatively in circuit and out of circuit with the battery 22 by a user's selective actuation of the switch assembly 26. Switch 26 has an OFF position in which the switch is not connected to the battery 22 (schematically represented by the solid-line contacts 32 and 34 spaced from their respective switch contacts 36 and 38), a first ON position connected to the battery 22 (schematically represented by the dashed-line contact 32 in contact with its switch contacts 36 while contact 34 is not in contact with contacts 38), and a second ON position connected to the battery 22 (schematically represented by the dashed-line contact 34 in contact with its switch contacts 38 irrespective of whether contact 32 is in contact with contacts 36). When the switch 26 is in its first ON position, the resistor 28 is in series circuit with the battery 22; and when the switch 26 is in its second ON position, the resistor 28 is not in circuit with the battery 22.

The flashlight 10 is provided with a controller 30 in circuit with the battery 22, the switch assembly 26 and the light emitter assembly 16. While the switch assembly 26 and resistor 28 are preferably located in the tail cap assembly 24 at the rear of the battery housing 12, the controller 30 is preferably a printed circuit assembly located at the front end of the battery housing 12 in proximity to the light emitter assembly 16. A conductive path along the battery housing 12, such as by the housing being fabricated of a metal (e.g. aluminum) or by the housing 12 having a metallic sleeve, electrically couples one terminal 39 of the battery 22 with the controller 30 and light emitter assembly 16 through the switch assembly 26 and resistor 28.

When the switch assembly 26 is in its OFF position, there is no power to the controller 30 and to the light emitter assembly 16. As will be later described in greater detail, when the switch assembly 26 is actuated by a user to either one of its ON positions, the controller 30 determines which of the two ON positions is actuated by detecting whether the resistor is in series circuit, providing power only to the LEDs 20 if the resistor 28 is detected (i.e. if the switch's first ON position is actuated) and providing power to both the LEDs 20 and the incandescent lamp 18 if the resistor 28 is not detected (i.e. if the switch's second ON position is actuated).

The tail cap and switch assemblies 24, 26 and their operation will be described in connection with FIGS. 3–14 in addition to FIGS. 1 and 2. The tail cap assembly 24 includes an internally threaded rear cap 40 threadedly engaging the externally threaded rear end portion 42 of the cylindrical battery housing 12. By such threaded engagement, the rear cap 40 may be rotated about the longitudinal axis a of the battery housing 12, such rotation causing translational displacement of the tail cap assembly 24 with respect to the battery housing 12 along the longitudinal axis a.

Figure 3:
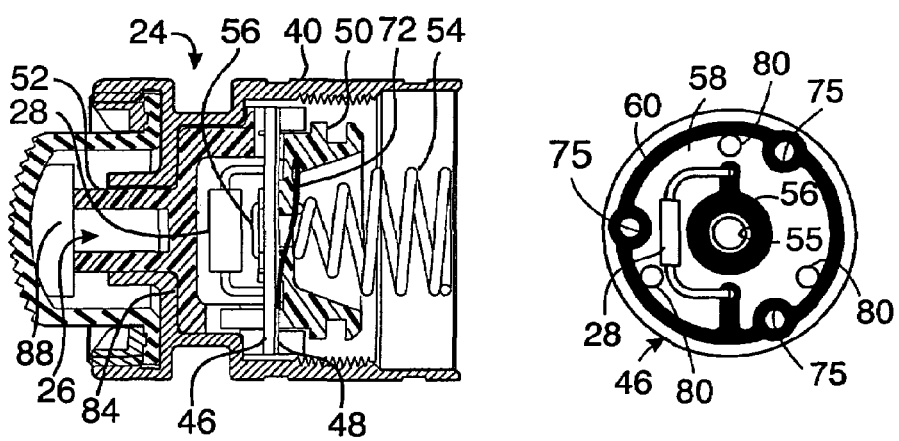
FIG. 3 is a side generally cross-sectional view of a tail cap assembly of the flashlight of FIG. 1, shown in increased scale for ease of description.
Figure 4:
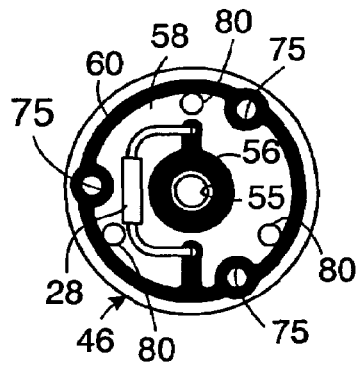
FIG. 4 is a view of the rear face of an example of a circuit board included in the tail cap assembly of FIG. 3.

The tail cap assembly 24 includes a circuit board assembly 44 including a circuit board 46 (such as a printed circuit board) and switch contact member or washer 48 secured between a battery rear terminal contact spring retainer 50 and a pushbutton retainer 52. The battery terminal contact spring 54 is secured to the spring retainer 50 and to a central conductive portion 55 of the circuit board 46 by a conductive eyelet 56 extending through a central aperture 57 in the circuit board 46 and to the circuit board's rear face 58 (FIGS. 3 and 4). One end of the resistor 28 is soldered to the conductive portion 55 and is thereby conductively connected to the eyelet 56 and hence to the battery terminal contact spring 54, while the other end of the resistor 28 is soldered to a closed conductive path 60 adjacent to the circumference of the circuit board's rear face 58.

The front face 62 (FIG. 5) of the circuit board 46 has printed thereon at least one and preferably three conductive pads 64 conductively extending to a conductive central portion 66 in conductive contact with the eyelet 56 and hence with the rear face conductive central portion 55 and the battery terminal contact spring 54.

A nonconductive solder mask 68 (FIG. 6) is superimposed upon the circuit board's front face 62 rearwardly of the switch contact washer 48. The solder mask 68 includes apertures 70 therethrough corresponding to the conductive pads 64 and the central conductive area 66 on the circuit board's front face 62.

Figure 7:
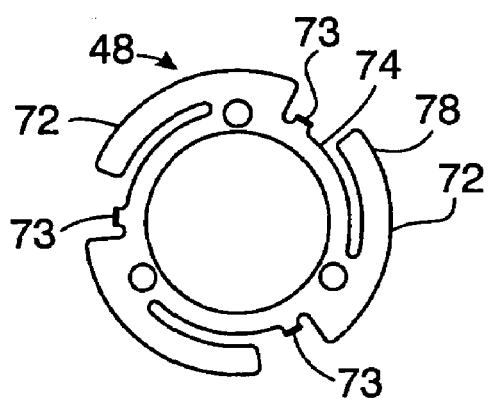
FIG. 7 is a rear view of a contact washer included in the tail cap of FIG. 3.
Figure 8:
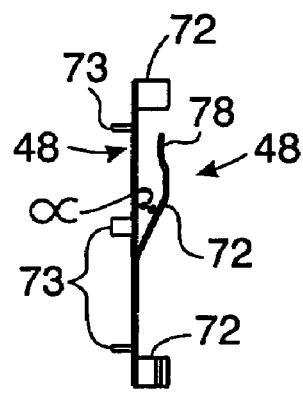
FIG. 8 is a side view of the contact washer of FIG. 7.
Figure 9:
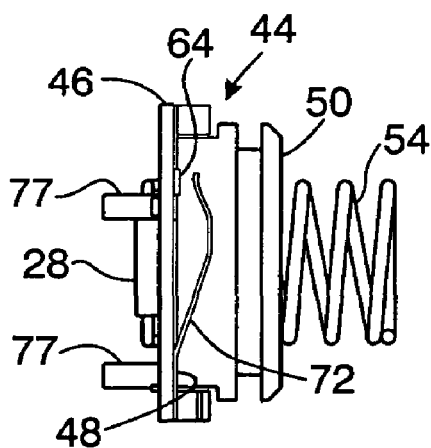
FIG. 9 is a side view of the switching contacts/circuit board assembly of FIG. 3.

The switch contact washer 48 (FIG. 7) comprises an annular conductive member with at least one and preferably three flexible resilient arcuate arms 72 along the washer's periphery and projecting from the washer base portion 74 along a forwardly acute angle α (FIG. 8). The contact washer 48 is secured to the circuit board 46 and is in conductive engagement with the conductive path 60 on the circuit board's rear surface 58, by means of washer tabs 73 extending from the washer base portion 74 and through respective apertures 75 in the circuit board 46, and soldered to the conductive path 60. The spring retainer 50 is fixedly secured to the pushbutton retainer 52, with the central portion of the circuit board 46 and the contact washer base portion 74 sandwiched therebetween, by means of spring retainer rearward projections 77 extending through apertures 80 in the circuit board 46 and fastened to the pushbutton retainer 52.

The diameter of the contact washer 48 and the projection profile of each of the arms 72 are such that the arms 72 are brought into conductive contact with the conductive rear edge 76 of the battery housing 12 when the circuit board assembly 44 is forwardly displaced or translated by a first predetermined distance along the longitudinal axis a, and further forward displacement or translation of the circuit board assembly 44 by a second predetermined distance causes respective pads 64 to come into conductive contact with the end portions 78 of the resilient arms 72. The switch contact washer 48, in one example, was constructed of a nickel-plated approximately 0.006 inch thick beryllium copper alloy.

With the batteries 22 in circuit in the battery housing 12 (as in FIG. 1), the rear battery terminal 39 contacts the battery rear contact spring 54 while the front battery terminal 82 contacts the front battery terminal contact spring 83 connected to the controller 30 and light emitters 18, 20 as schematically shown in FIG. 2. The consequent axial compression of the rear spring 54 rearwardly biases the circuit board assembly 44 and its secured pushbutton retainer 52 against a forwardly facing internal shoulder 84 of the tail cap 40.

Figure 10:
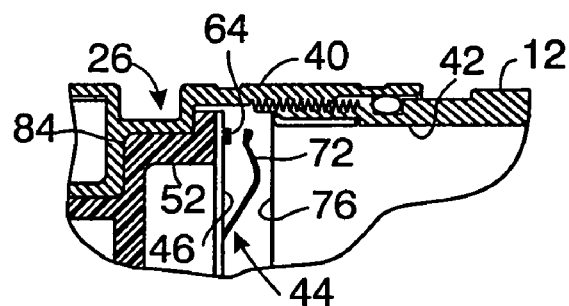
FIG. 10 shows a fragment of the flashlight of FIG. 1, generally within the area bounded by the dashed line A of FIG. 1 and greatly enlarged, representing the tail cap switch assembly in an OFF position.

FIG. 10 shows the tail cap switch 26 in its OFF position, when the tail cap 40 is threaded onto the rear threaded portion of the battery housing 12 such that the flexible contact washer arms 72 are not in contact engagement with the rear edge 76 of the conductive battery housing 12. For convenience of description, the spring retainer 50 and spring 54 of the circuit board assembly 44 are not shown in FIGS. 10–14.

The first ON position of the tail cap switch 26 is effected by forwardly moving the circuit board assembly 44 against the bias of the battery rear terminal contact spring 54, until the contact washer arms 72 come into contact engagement with the battery housing conductive rear edge 76. This may be accomplished either by the user's rotating the tail cap 40 in one direction with respect to the battery housing 12 which results in forward translatory displacement of the tail cap 40 by a first distance and hence of the pushbutton retainer/circuit board assembly combination 52, 44 against the bias of the spring 54, as indicated by the arrow 86 in FIG. 11; or by the user's depressing or manually forwardly urging the tail cap's pushbutton 88 by a first distance which results in forward translation or displacement of the pushbutton retainer/circuit board assembly combination 52, 44 from the tail cap shoulder 84 and against the bias of the spring 54, as indicated by the arrow 89 in FIG. 13. When switch actuation is accomplished by pushbutton depression, the user's release of the pushbutton 88 permits the pushbutton retainer/circuit board assembly combination 52, 44 to be urged rearwardly by the bias of the spring 54 to the switch's OFF position shown in FIG. 10.

The second ON position of the tail cap switch 26 is effected upon forward displacement of the circuit board assembly 44 until the contact washer arms 72 are in contact engagement with the respective circuit board pads 64 as well as in contact engagement with the battery housing conductive rear edge 76. This may be accomplished by continuing to threadedly rotate the tail cap 40 upon the battery housing threaded rear end portion 42, thereby forwardly displacing or translating the tail cap 40 by a second distance along with the pushbutton retainer/circuit board assembly combination 52, 44 against the bias of the spring 54, until—with the contact washer arms 72 remaining in contact engagement with the battery housing rear edge 76—the pads 64 contact the end portions 78 of the contact washer arms 72 respectively. Alternatively, the user may depress or manually forwardly urge the tail cap pushbutton 88 by a second distance for forwardly displacing the pushbutton retainer/circuit board assembly combination 52, 44 away from the tail cap shoulder 84 against the bias of the spring 54, until the pads 64 respective contact the end portions 78 of the contact washer arms 72 while the contact washer arms 72 remain in contact engagement with the battery housing rear edge 76, as shown in FIG. 14. When the second ON position is pushbutton actuated, the user may partially release the pushbutton 88 to effect the first ON position shown in FIG. 13 or he may fully release the pushbutton 88 to effect the OFF position shown in FIG. 10.

Figure 11:
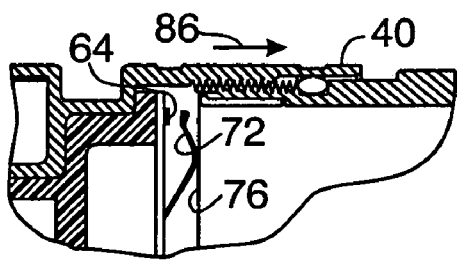
FIG. 11 is a fragmentary representation similar to FIG. 10, showing the tail cap switch assembly in a rotary actuated first ON position.

When the first ON position has been effected through forward translation by rotating the tail cap 40 as shown in FIG. 11, the switch's OFF position of FIG. 10 may be effected by the user's reversely rotating the tail cap 40 with respect to the battery housing for translating the tail cap 40 in the rearward direction (opposite the arrow 86). Similarly, when the switch 26 is in its second ON position shown in FIG. 12, the switch may be placed in its first ON position of FIG. 11 or in its OFF position of FIG. 10 by reverse rotation and rearward translation of the tail cap 40 with respect to the battery housing 12.

When the first ON position has been effected by forward rotation of the tail cap 40 as shown in FIG. 11, the switch second ON position may be pushbutton actuated. The user's release of the pushbutton 88 will return the switch 26 to its first ON position as shown in FIG. 11.

Figure 12:
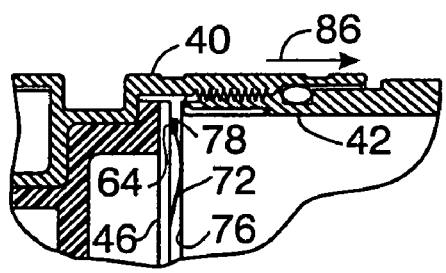
FIG. 12 is a fragmentary representation similar to FIG. 10, showing the tail cap switch assembly in a rotary actuated second ON position.
Figure 13:
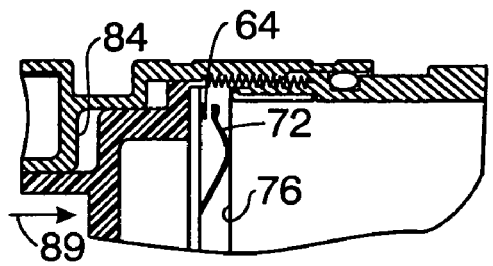
FIG. 13 is a fragmentary representation similar to FIG. 10, showing the tail cap switch assembly in a pushbutton actuated first ON position.
Figure 14:
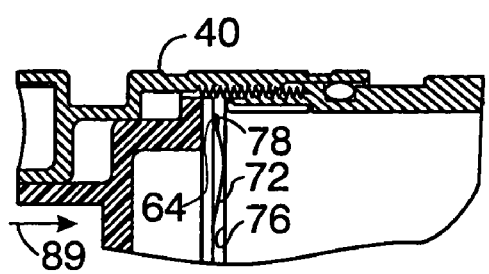
FIG. 14 is a fragmentary representation similar to FIG. 10, showing the tail cap switch assembly in a pushbutton actuated second ON position.

When the tail cap switch 26 is in its first ON position shown in FIG. 11 or FIG. 13, the contact engagement between the contact washer 48 and the conductive battery housing 12 completes the circuit of FIG. 2 with the resistor 28 in circuit between the battery 22 and the load (controller 30 and light emitters 18, 20). When the switch 26 is in its second ON position shown in FIG. 12 or FIG. 14, the resistor 28 is shorted out of the circuit, and the battery 22 is connected directly to the load.

Figure 15:
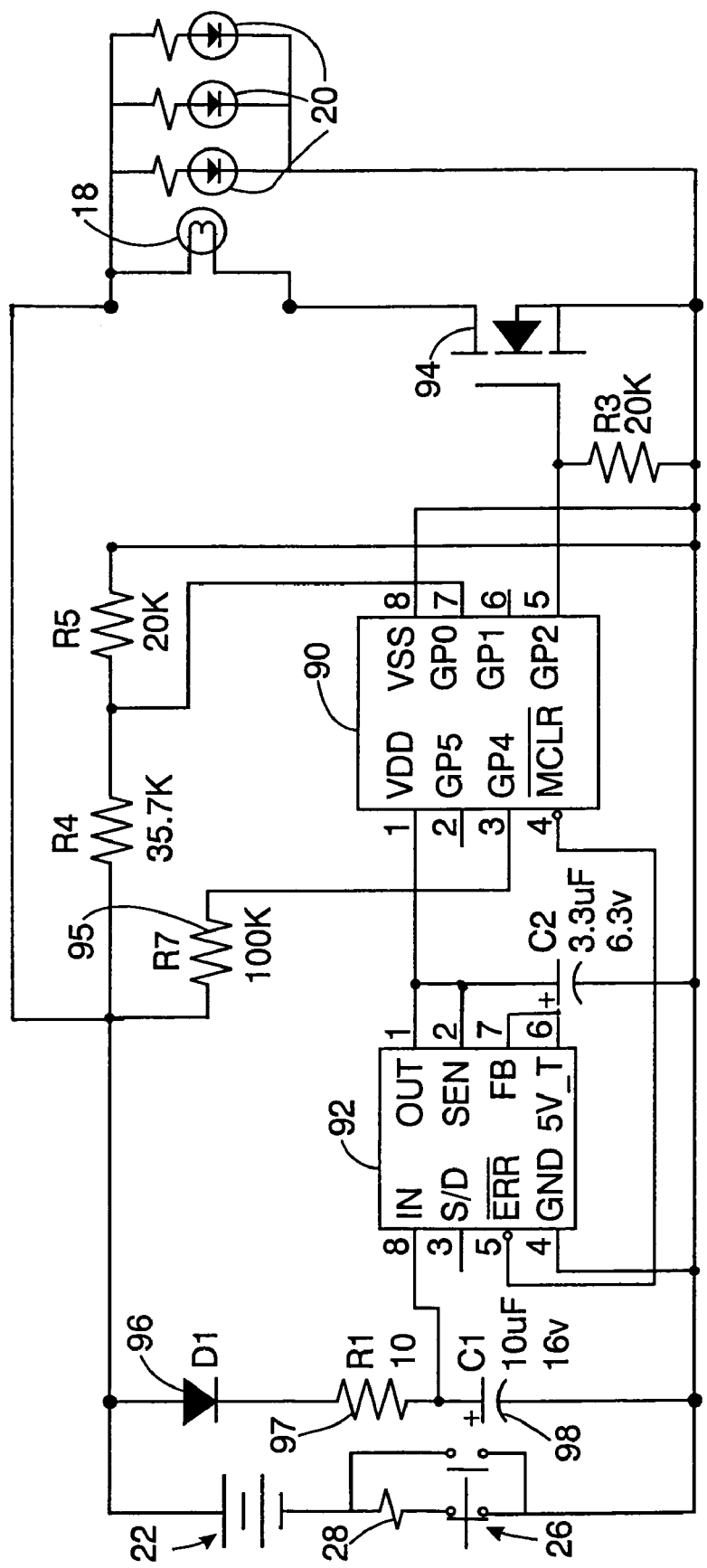
FIG. 15 is an example of a circuit diagram for the flashlight of FIGS. 1 and 2.

FIG. 15 shows an example of a circuit for the controller 30 of FIG. 2 for the flashlight 10. This example includes a six-volt battery such as may be provided by two three-volt lithium battery cells 22, and the tail switch assembly resistor 28 is approximately ten ohms, the incandescent emitter 18 may comprise a conventional tungsten light bulb for producing a light output of approximately sixty lumens when powered by the two lithium cells 22, and the LEDs 20 may comprise three commonly available LEDs such as Nichia white LEDs for producing a light output of approximately five lumens when powered by the two lithium cells 22 (although other colored LEDs 20 may be utilized as well, including red, blue, green or infrared).

The controller 30 includes a microprocessor 90, such as a PIC12C671 manufactured by Microchip Technology Inc. (of Chandler, Ariz.), a low dropout voltage regulator 92 such as the LP2951 manufactured by National Semiconductor Corporation, and a power MOSFET 94 such as an IRF7401 FET manufactured by International Rectifier (of El Segundo, Calif.).

The microprocessor-based controller of FIG. 15 senses the presence of the tail cap assembly series resistor 28 by looking at the power source voltage drop when the tungsten light bulb 18 is connected. Three circuit design capabilities are utilized for permitting the microprocessor 90 to accomplish this task. First, the microprocessor 90 can turn on or off the tungsten light bulb 18 with the power FET 94 (connected to GPIO2) which is also used for maintaining regulated RMS voltage to the light bulb 18. Second, the microprocessor 90 can sense the power source voltage rapidly by a transistor-transistor logic (TTL) threshold input through resistor 95 (one hundred kilo-ohms in this example) connected to GPIO4. Third, the circuit provides the microprocessor 90 with its own stable power source during interruption in the main power, such as by a diode 96 (preferably a Schottky diode of, for example, one hundred milliamps), series resistor 97 (e.g., ten ohmns) and capacitor 98 (e.g., ten microfarads) from the main source feeding the regulator 92.

Specifically, by the circuit of FIG. 15, the microprocessor 90 determines whether or not the tail cap assembly resistor 28 is present in the circuit, by utilizing the following procedure. The procedure starts by the microprocessor 90 connecting the tungsten light bulb 18 to the presented power source (the battery 22 and the switch assembly resistor 28). It does this by turning on the power FET 94 which connects the tungsten bulb 18 to the presented power source, and after a few microseconds the microprocessor 90 samples the power source voltage. If the ten-ohm resistor 28 is present, the power source voltage will drop to about one hundred fifty millivolts with a cold tungsten bulb, which is well below the logic low TTL level threshold (normally 0.8 volts) of the microprocessor input. If the bulb 18 is hot, then the power source drops to about 1.5 volts, which may not be immediately a TTL logic low; however, the bulb will cool in the next few milliseconds and the voltage will drop well below the TTL logic low threshold. If the power source voltage sags below a TTL logic low-level threshold, the microprocessor 90 turns off the power FET 94. In this way, the microprocessor 90 quickly detects that the ten-ohm resistor 28 is present with the procedure that takes only a few microseconds. The microprocessor 90 then waits for say four milliseconds and then repeats such procedure. If the tail switch resistor 28 is not present, then the sampled voltage is almost always above the TTL logic high threshold (normally 2.0 volts) with the tungsten light bulb hot or cold. The exception is when the battery is heavily drained, but typically such a battery will not light the tungsten bulb 18 so that this resistor detection system maintains the available power for the LEDs 20.

During the resistor detection system cycling when the power FET 94 is off, the available power source voltage drives the three LEDs 20 with about thirty-five milliamps of current in each LED 20 or about one hundred milliamps total. Since this procedure for detecting the series resistor 28 occurs about 0.6% of the time, the power loss associated with the detection procedure is about 3% additional as compared with not sampling at all. Further, the four-millisecond sample period allows the microprocessor 90 to respond quickly to the user's switching the tail cap switch 26 to its second ON position (i.e. shorting out the tail cap resistor 28) for effecting full brightness of the light emitter assembly (i.e., with both the tungsten light bulb 18 and the LEDs 20 being energized).

A second preferred flashlight embodiment 110 according to the present invention, is shown in FIGS. 16–20 wherein components having three-digit reference numerals (starting with 110) in which the first digit is a one (i.e., 100-series reference numerals) are similar to components shown in FIGS. 1–15 having two-digit reference numerals corresponding to the second and third digits of such 100-series reference numerals.

The flashlight 110 includes a single incandescent lamp 118 in the light emitter assembly 116, preferably a tungsten light bulb 118, with two user-selectable brightness levels powered by a six-volt battery such as the two three-volt lithium battery cells 22. Examples of such tungsten light bulbs 118 are well known and readily available, including such bulbs for producing—when used in the flashlight 110 of the present invention—one hundred lumens in its bright setting and twenty lumens in its dim setting, or sixty lumens in its bright setting and twelve lumens in its dim setting, or twenty-five lumens in its bright setting and five lumens in its dim setting.

The tail cap assembly 124 includes a switch assembly 126 similar to the tail cap and switch assemblies 24, 26 of the flashlight 10 shown in FIGS. 1–14, except that the electrical component which may be placed alternatively in circuit and out of circuit with the battery 22 by the user's selective operation of the switch assembly 126 is implemented by an inductor 100 rather than by the resistor 28. An example of such an inductor is provided by a copper wire-wound magnetic toroidal core, such as a Magnetecs #0J41003-TC magnetic core wound with twenty turns of 24 AWG wire.

Figure 18:
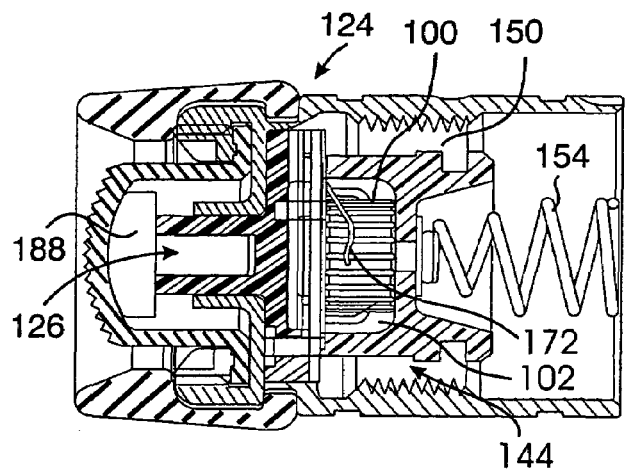
FIG. 18 is a side generally cross-sectional view of a tail cap switch assembly of the flashlight of FIG. 16, shown in increased scale for ease of description.
Figure 19:
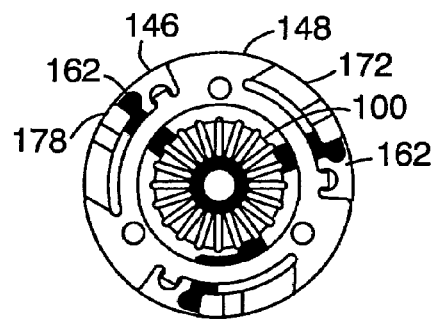
FIG. 19 is a front view of the circuit board/contact washer combination included in the tail cap assembly of FIG. 18.

The circuit board assembly 144 of the flashlight 110 is similar to the circuit board assembly 44 shown in FIGS. 3–9, except that the tail cap assembly inductor 100 replaces the tail cap assembly resistor 28. Because of its size, the inductor 100 is more conveniently situated on the circuit board's front face 162 rather than on the circuit board's rear face, the toroidal inductor 100 being physically contained within a compartment 102 of the spring retainer 150 (FIG. 18).

The tail cap and switch assemblies 124, 126 of the flashlight 110, and their operation, are as shown in FIGS. 10–14 and described above in connection with the flashlight 10, for effecting the OFF, first ON and second ON positions of the tail cap switch 126. When the switch assembly 126 is in its OFF position (as shown in FIG. 10), there is no power to the controller 130 and to the bulb 118. During the first ON position (as shown in FIG. 11 or FIG. 13), the contact engagement between the flexible arms 172 of the contact washer 148 and the rear edge 176 of the conductive battery housing 112 completes the circuit of FIG. 17 with the inductor 100 in series circuit between the battery 22 and the load (controller 130 and tungsten bulb 118). When the switch 126 is in its second ON position (as shown in FIG. 12 or FIG. 14), the inductor 100 is shorted out of the circuit, and the battery 22 is connected directly to the load.

Figure 17:
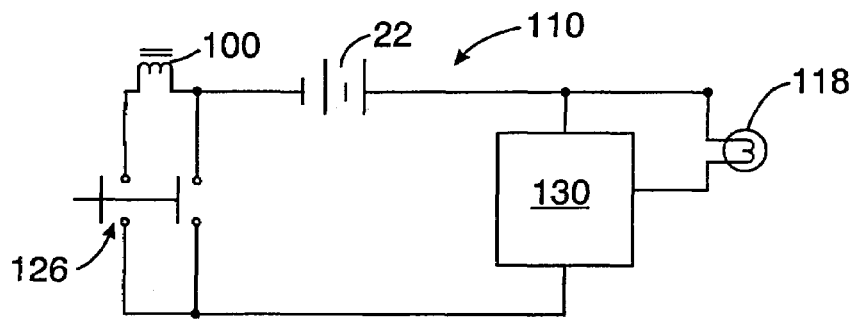
FIG. 17 is a schematic diagram of the flashlight of FIG. 16.
Figure 20:
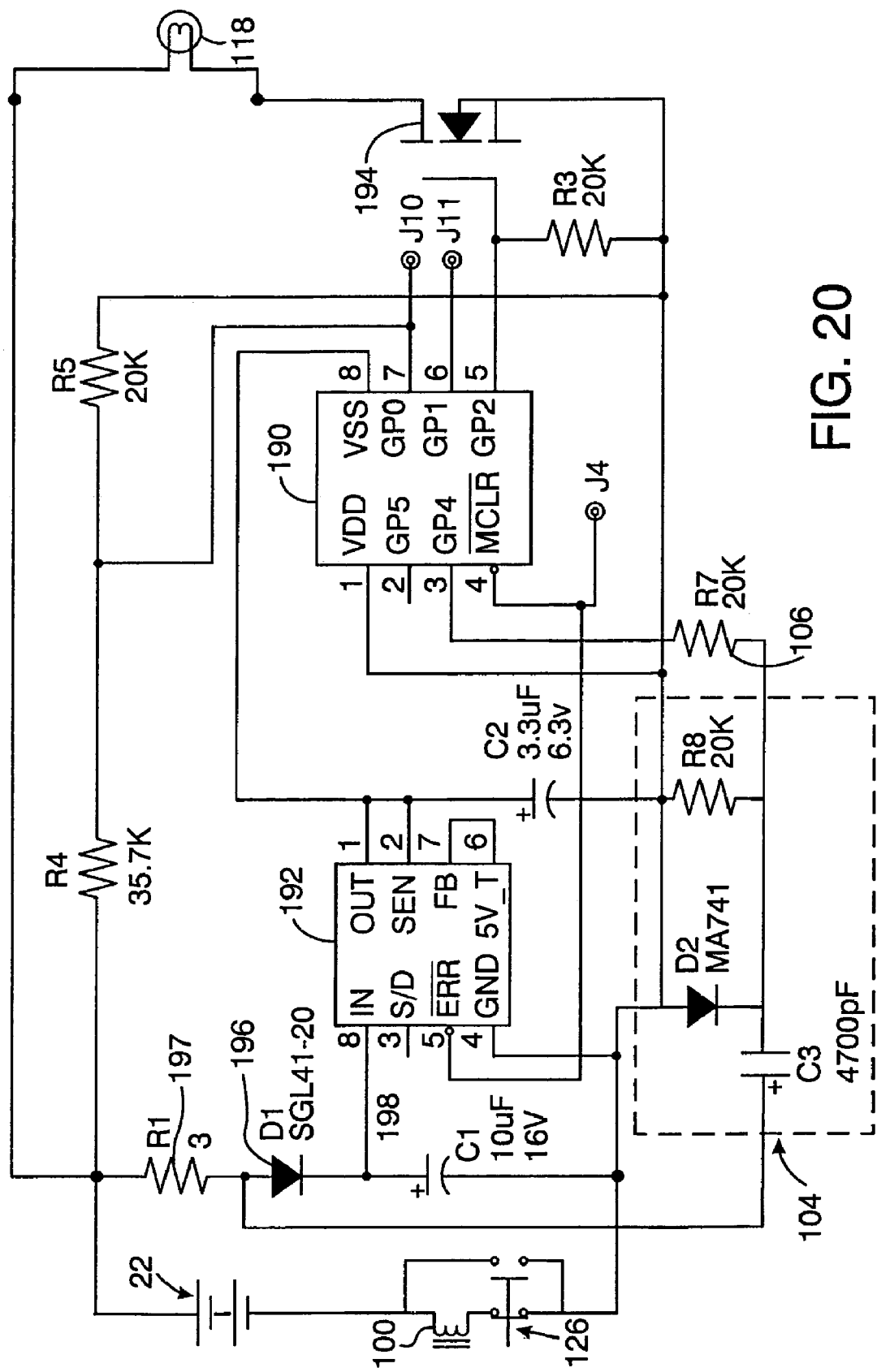
FIG. 20 is an example of a circuit diagram for the flashlight of FIGS. 16 and 17.

FIG. 20 shows an example of a circuit for the controller 130 of FIG. 17 for the flashlight 110. The controller 130 includes a microprocessor 190 similar to the microprocessor 90, a low drop out voltage regulator 192 similar to the voltage regulator 92, and a power MOSFET 194 such as an IRF3803 FET (manufactured by International Rectifier).

The microprocessor-based controller of FIG. 20 senses the presence of the switch assembly series inductor 100 by looking at the power source voltage drop spike when the tungsten light bulb 118 is connected. Three circuit design capabilities are utilized for permitting the microprocessor 190 to accomplish this task. First, the microprocessor 190 can turn on or off the tungsten light bulb 118 with the power FET 194 (connected to GPIO2) which is also used for maintaining regulated RMS voltage to the light bulb 118. Second, the microprocessor 190 can sense saturation of the inductor 100 by an inductor saturation detection circuit 104 connected through a twenty kilo-ohm resistor 106 to a TTL threshold input (GPIO4). Third, the circuit provides the microprocessor 190 with its own stable power source during interruption in the main power, such as by a diode 196 (preferably a Schottky diode of, for example, one amp), series resistor 197 (e.g., three ohms) and capacitor 198 (e.g., ten microfarads) from the main source feeding the regulator 192.

Specifically, by the circuit of FIG. 20, the microprocessor 190 determines whether or not the tail cap assembly inductor 100 is present in the circuit, by utilizing the following procedure. The procedure starts by the microprocessor 190 connecting the tungsten light bulb 118 to the presented power source (the battery 22 and the tail cap assembly inductor 100). It does this by turning on the power FET 194 which connects the tungsten bulb 118 to the presented power source, and after a few microseconds the microprocessor 190 samples the induction saturation detection circuit 104. If the inductor 100 is present, the sampled voltage normally will be well above the TTL logic high threshold, and the microprocessor 190 will provide the low power setting to the bulb 118. If the inductor 100 is not present, the sampled voltage will always be well below the TTL logic low threshold, and the microprocessor 190 will provide the high power setting to the bulb 118.

The use of a saturating series inductor 100 in the switch assembly 126 achieves very high power efficiency because the loss is mostly resistance of the inductor's copper wire, since the inductive reactance happens for about four microseconds every four milliseconds. The copper wire resistance is only 22 milliohms, being only twenty turns of 24 AWG wire on a high permeability ferrite toroidal core measuring 0.37-inch diameter by 0.125 inch squared in cross section. Such resistance causes less than 2% power loss with the one hundred lumen bulb 118, and much less with bulbs of lesser light output.

Figure 21:
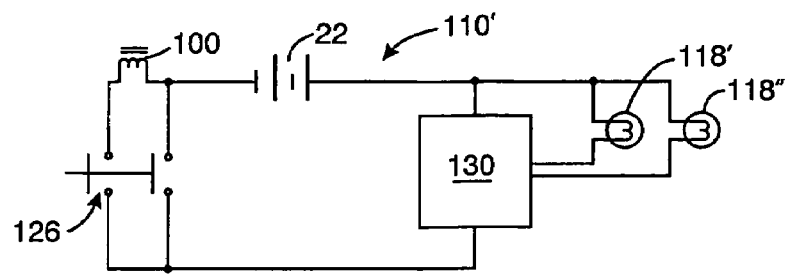
FIG. 21 is a schematic diagram of a third preferred embodiment of a flashlight apparatus according to the present invention.

A third preferred flashlight 110' embodiment according to the present invention, represented in FIG. 21, includes two incandescent light bulbs 118' and 118" with two user-selectable brightness levels. This flashlight embodiment works much the same as the single tungsten bulb 118 flashlight 110, but instead of dimming one bulb for low light output, a low light output bulb 118' is switched on and run at full power when the tail switch is in one of its ON positions, preferably the first ON position. When the tail switch is in the other (preferably second) ON position, a high light output bulb 118" is switched on. In such other (second) ON position, the low output bulb 118' may be switched off, or it may remain on along with the high output bulb 118".

Figure 22:
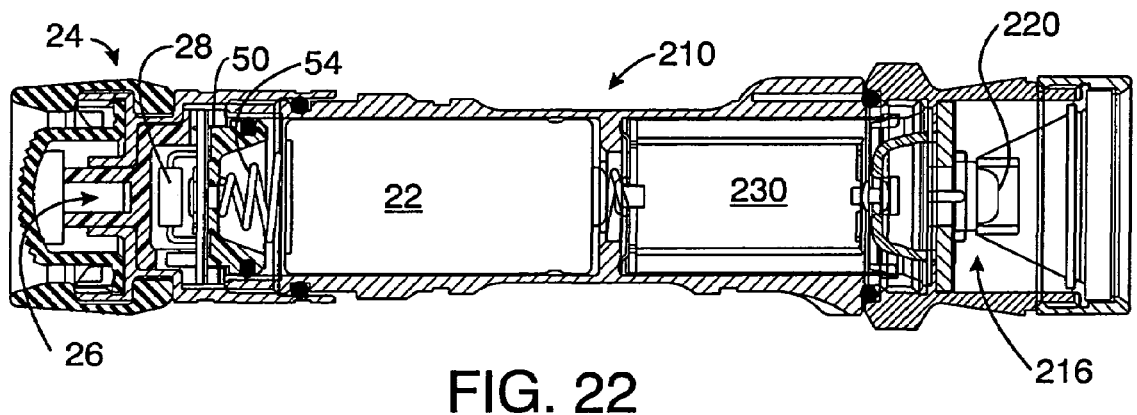
FIG. 22 is a side generally cross-sectional view of a fourth preferred embodiment of a flashlight apparatus according to the present invention.
Figure 23:
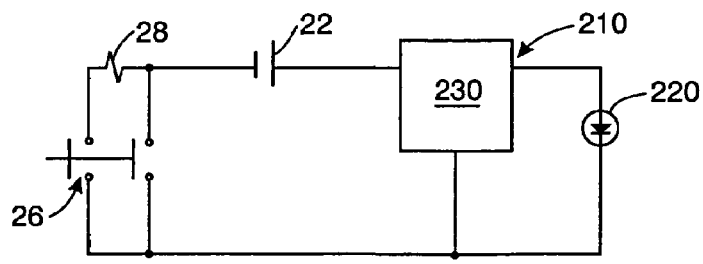
FIG. 23 is a schematic diagram of the flashlight of FIG. 22.
Figure 24:
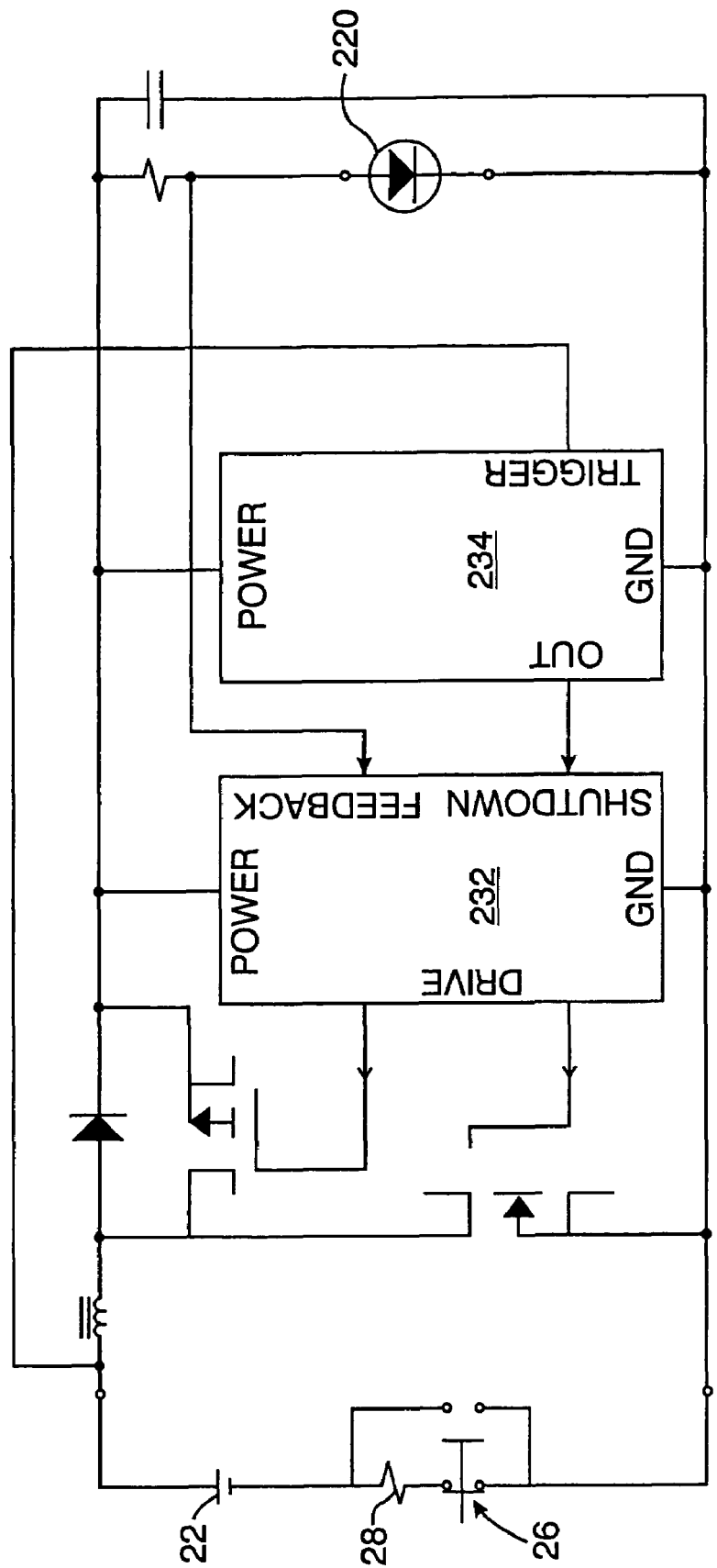
FIG. 24 is an example of a circuit diagram for the flashlight of FIGS. 22 and 23.

A fourth preferred flashlight embodiment 210 according to the present invention is shown in FIGS. 22–24, for selectively producing two brightness levels from a single LED. The flashlight 210 utilizes a high luminous flux LED 220 in the light emitter assembly 216, such as a one-watt LED manufactured by Lumileds Lighting, LLC (of San Jose, Calif.) and marketed under the trademark LUXEON including such LEDs marketed under the LUXEON STAR trademark.

The flashlight 210, in the embodiment shown, is powered by a three-volt battery 22 such as a single three-volt lithium battery cell, and includes tail cap and switch assemblies 24, 26 similar to the tail cap and switch assemblies 24, 26 of the flashlight 10 shown in FIGS. 1–14, including the tail cap resistor 28, for effecting the OFF, first ON and second ON positions of the tail cap switch 26.

In connection with the flashlight 210, there is no power to the controller 230 and to the LED 220 when the switch assembly 26 is in its OFF position (as shown in FIG. 10).

During the first ON position (as shown in FIG. 11 or 13), the contact engagement between the flexible arms 72 of the contact washer 48 and the rear edge 76 of the conductive battery housing 12 completes the circuit of FIG. 23 with the resistor 28 in series circuit between the battery 22 and the load (controller 230 and LED 220). When the switch 26 is in its second ON position (as shown in FIG. 12 or FIG. 14), the resistor 28 is shorted out of the circuit, and the battery 22 is connected directly to the load.

FIG. 24 shows an example of a circuit for the controller 230 of FIG. 23 for the flashlight 210. The controller 230 includes a synchronous DC to DC boost converter 232 with output current feedback to regulate LED high power brightness when it is connected directly to the three-volt battery 22, i.e. when the tail cap switch ten-ohm resistor 28 is shorted out of the circuit during the time that the tail cap switch assembly 26 is in its second ON position.

When the tail cap switch ten-ohm series resistor 28 is present in the circuit (i.e. when the switch 26 is in its first ON position), the input voltage rapidly drops to near zero volts when the DC to DC converter 232 tries to boost the input voltage to the required output voltage and current. The controller's detector circuit and one-shot 234, shown in FIG. 24, cause the DC to DC converter 232 to shut down for about ten milliseconds. In the shutdown state, the converter input is effectively connected to the output, allowing the LED 220 to be dimly lit. A preferred embodiment of this circuit matches the forward voltage of the LED 220 to the voltage of the lithium battery cell 22 at this low power level, less the drop in the tail cap ten-ohm resistor 28. Utilizing a one-watt LUXEON STAR LED 220, a three-volt lithium battery cell 22, and a ten-ohm tail cap resistor 28, the flashlight 210 would produce a light output of approximately one lumen when the tail cap switch 26 is in its first ON position and a light output of approximately ten lumens when the tail cap switch 26 is in its second ON position.

Figure 25:
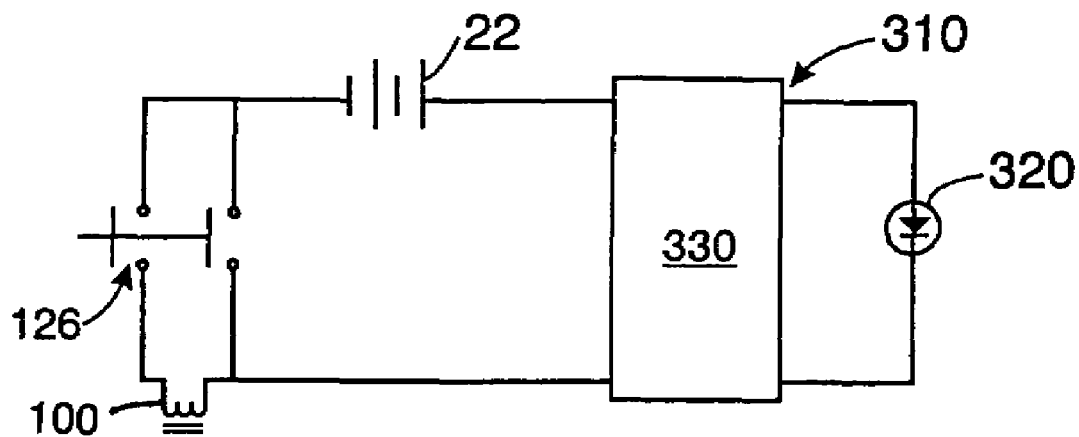
FIG. 25 is a schematic diagram of a fifth preferred embodiment of a flashlight apparatus according to the present invention.
Figure 26:
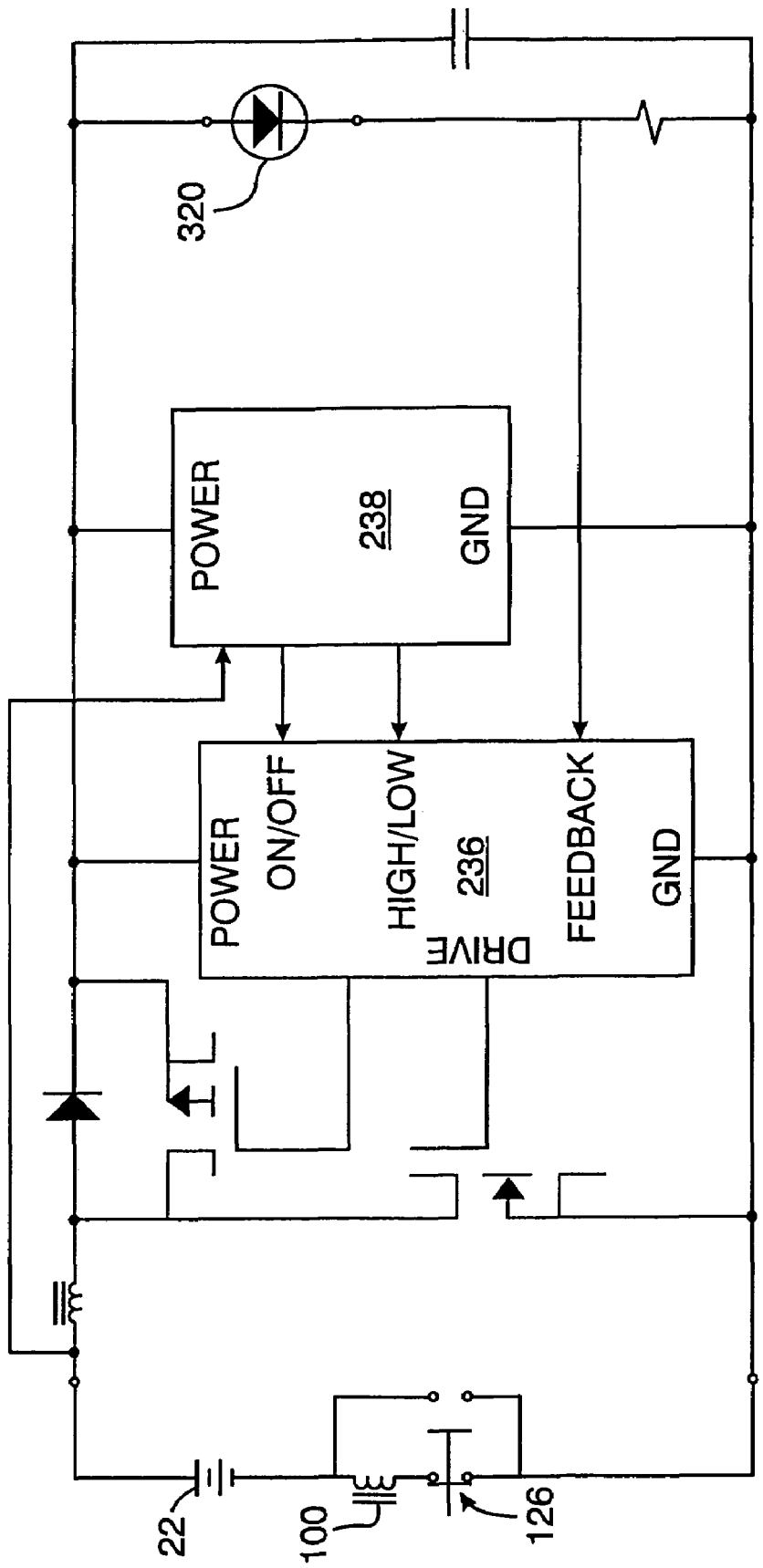
FIG. 26 is an example of a circuit diagram for the flashlight of FIG. 25.

A fifth preferred flashlight embodiment 310 according to the present invention, represented in FIGS. 25 and 26, also selectively produces two brightness levels from a single LED. The flashlight 310 utilizes an even higher luminous flux LED 320 in the light emitter assembly, such as a five-watt LED manufactured by Lumileds Lighting, LLC and marketed under the trademark LUXEON including such LEDs marketed under the LUXEON V STAR trademark. Except for the LED 320 instead of the tungsten bulb 118, and as otherwise discussed below, the flashlight 310 is similar to the flashlight 110 of FIG. 16.

The flashlight 310 is powered by a six-volt battery 22 such as two three-volt lithium battery cells, and includes tail cap and switch assemblies 124, 126 similar to the tail cap and switch assemblies 124, 126 of the flashlight 110 shown in FIGS. 16–19, including the tail cap switch series inductor 100, for effecting the OFF, first ON and second ON positions of the tail cap switch 126.

In connection with the flashlight 310, there is no power to the controller 330 and to the LED 320 when the switch assembly 126 is in its OFF position (as shown in FIG. 10). During the first ON position (as shown in FIG. 11 or 13), the circuit of FIG. 25 is completed with the inductor 100 in series circuit between the battery 22 and the load (controller 330 and LED 320). When the tail cap switch 126 is in its second ON position (as shown in FIG. 12 or FIG. 14), the inductor 100 is shorted out of the circuit, and the battery 22 is connected directly to the load.

FIG. 26 shows an example of a circuit for the controller 330 of FIG. 25 for the flashlight 310. The controller 330 includes a synchronous DC to DC boost converter 236 with output current feedback to regulate LED high power brightness when it is connected directly to the six-volt battery 22, i.e. when the tail cap switch inductor 100 is shorted out of the circuit during the time that the tail cap switch assembly 126 is in its second ON position.

When the tail cap series inductor 100 is present in the circuit (i.e. when the switch 126 is in its first ON position), the controller 330 reduces the LED power to the low brightness level. The controller 330 periodically senses for presence of the inductor 100 in similar manner as the controller 130 of the flashlight 110. As shown in FIG. 26, a microprocessor 238 first turns off the DC to DC converter 236 thereby allowing the tail cap inductor 100 to come out of saturation, then test loads the input to detect the inductor 100, and finally returns the DC to DC converter 236 to the high or low power level depending on whether or not the inductor 100 was detected.

Utilizing a five-watt LUXEON V STAR LED 320, a six-volt battery 22 comprising two three-volt lithium cells, and an inductor 100 as previously described in connection with the flashlight 110, the flashlight 310 would produce a light output of approximately ten lumens when the tail cap switch 126 is in its first ON position and a light output of approximately sixty lumens when the tail cap switch 126 is in its second ON position.

In the above-described flashlights, the controller regulates the power to the light emitters for providing light output of constant brightness with decreasing battery voltage over time. For tungsten light bulbs, pulse width modulation is used to maintain a constant DC coupled true RMS voltage. Regulating the voltage to light bulbs by pulse width modulation is described in the publication "Pulse Width Modulated Voltage Regulator for Electric Caving Lamps" by William A. Hunt, one of the present inventors, which publication is dated Sep. 22, 1993, revised in 1994 and 1995, and is available on the Internet at www.cs.indiana.edu/~willie, such publication being incorporated herein by reference; and in U.S. Pat. No. 4,499,525 to Henry R. Mallory, the disclosure of which patent is incorporated herein by reference.

Figure 27:
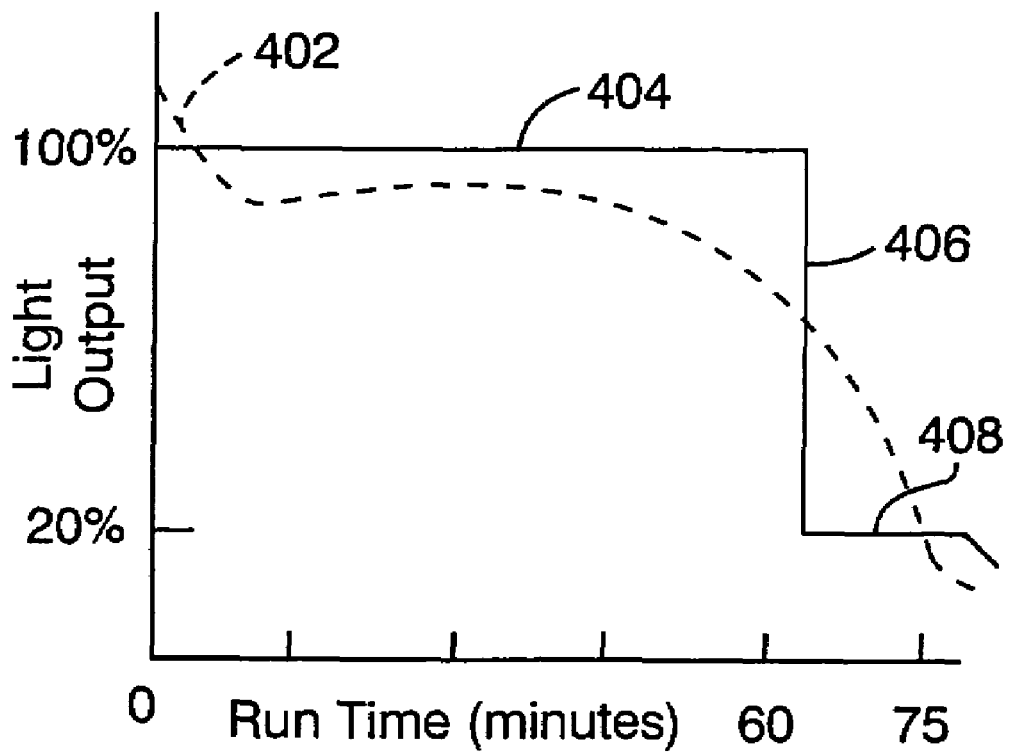
FIG. 27 is a graphical representation of an abrupt usable light output reduction feature of the present invention upon approaching battery exhaustion.

Using pulse width modulation for maintaining regulated RMS voltage to the light bulb, during each of the previously described sampling cycles when the flashlight's controller samples the battery voltage while the light bulb is connected, the controller calculates the correct duty cycle for the pulse width modulation (square of bulb voltage divided by square of input voltage) and generates that duty during the next cycle. In FIG. 27, the dashed line 402 represents a typical curve of light output versus run time without maintaining regulated voltage to the light bulb, using a tungsten light bulb and lithium battery combination wherein the battery would approach exhaustion in say sixty minutes. The light output as a function of time for the regulated voltage to the bulb is shown by the solid line 404 showing the regulated light output maintained at a constant level. At a programmed battery voltage set point which is near 100% duty cycle and also near battery exhaustion corresponding to say sixty minutes of run time, the controller abruptly reduces the bulb voltage to say 70% which abruptly and significantly reduces the light output to about 20% (shown by the solid line 406), giving the user a clear indication that the battery is approaching exhaustion. The controller preferably then maintains a constant lower bulb voltage for maintaining a constant brightness at the 20% light output level for a further time period, after which the light bulb may dim as the controller further reduces the bulb voltage while maintaining sufficient voltage for the controller to continue to properly function.

This extends the running time beyond that which would occur if the bulb were directly connected to the battery since, in such latter case, the nearly exhausted battery would not be able to directly support the high current draw of the bulb. After the abrupt programmed dropdown as shown in FIG. 27, the decreased light output (solid line 408) is preferably sufficient for providing the lowered constant light output for another say fifteen minutes, which light level is sufficient for permitting navigation as well as for permitting the user to retrieve fresh battery cells for replacing the exhausted cells in the flashlight.

For the LEDs, the controller maintains a constant current through the LED since forward current closely tracks light output and since an LED's forward voltage drop is poorly correlated with power input and varies with temperature. When the battery nears exhaustion, the controller dims the LED, giving the user an indication that the battery is nearing exhaustion. Since an LED's luminous efficiency increases with power decrease, the LED flashlights described above continue to give usable light even though the LED power drops by a large factor, providing the LED with a long run time of decreasing yet useful light output.

Turning to FIG. 28, there is shown a preferred embodiment of a flashlight 510 which is similar to the flashlight embodiment 10 of FIGS. 1–15 except that the tail cap assembly 24 of FIG. 1 is replaced by the tail cap assembly 512 of the type shown in FIG. 28 and hereinafter described. Like reference numerals are used in FIGS. 28–37 to identify like components shown in FIGS. 1–15. It may be appreciated that the tail cap assembly 512 of FIG. 28 may be substituted for the tail cap assemblies of the other flashlight embodiments described in FIGS. 16–25.

The flashlight 510 includes a generally cylindrical battery housing 12, a head 14 at the flashlight's front end including a light emitter assembly 16 with an incandescent lamp 18 and at least one light emitting diode (LED) 20 in electrical circuit with one or more battery, cells 22 in the battery housing 12. The incandescent lamp 18 of the preferred embodiment may be replaced by a high luminous flux LED such as the LED 220 or 320 previously described in connection with the flashlight embodiments shown in FIGS. 22 and 26. The rear or tail cap assembly 512 includes a switch 514 and a pushbutton switch actuator 515 for causing the circuit to energize the light emitter assembly 16 for producing two levels of brightness, the switch assembly having pushbutton-actuated momentary-ON and constant-ON capabilities for each brightness level.

The pushbutton switch actuator 515 is preferably of the push-push type, where a full longitudinal depression of the pushbutton from a switch OFF position causes the switch 514 to be placed in an ON position which is maintained after the pushbutton 520 is released (i.e., the switch 514 is in a constant-ON position), and where the next full longitudinal depression and release of the pushbutton 520 releases the switch 514 to its OFF position. Such switches conventionally have a tactile feel and produce a "click" when the pushbutton is depressed to its full travel, i.e. when placing the switch 514 in its constant-ON position and alternatively when placing the switch 514 to its OFF position from a constant-ON position. Such switches are often referred to as click-ON/click-OFF switches, or as having a click-ON/click-OFF pushbutton switch actuator.

The click-ON/click-OFF pushbutton switch actuator 515 includes a pushbutton plunger 520 slidably held by a switch body member 517 secured to the tail cap 534, and a rotor 516 in cooperative engagement with the pushbutton plunger 520 and a spring 518. The body member 517, the pushbutton plunger 520 and the rotor 516 include a series of interacting teeth, ribs and slots for producing the click-ON/click-OFF operation when the pushbutton 520 is fully depressed. Such click-ON/click-OFF pushbutton switch actuators are well known in the art, examples of which are shown and described in U.S. Pat. Nos. 4,230,921; 4,319,106; 4,463,231; 4,506,124; and 4,733,337; the disclosures of each of which patents are incorporated herein by reference.

The switch 514 includes a circuit board assembly 522 including a circuit board 524 (such as a printed circuit board) and a switch contact member or washer 48 (substantially as shown by the switch contact member or washer 48 of FIGS. 7 and 8) secured between a battery rear terminal contact spring retainer 528 and circuit board retainer 530. Longitudinal depression of the pushbutton 520 results in forward urging of the circuit board assembly 522 through the compressed spring 518 and against the bias of the battery contact spring 532.

Figure 16:
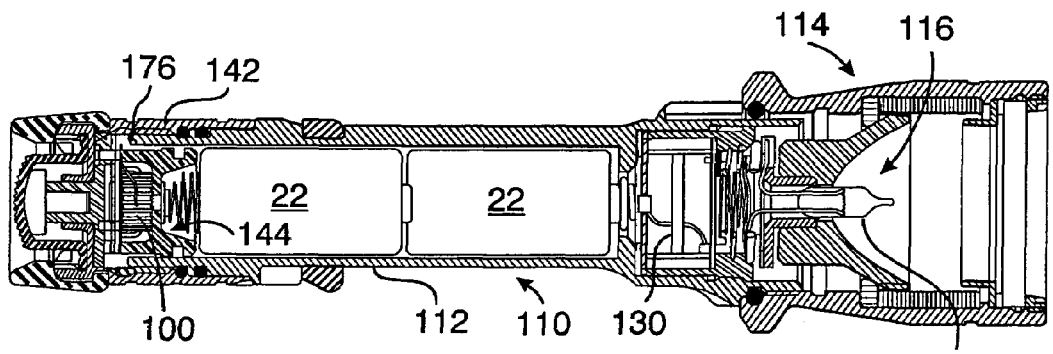
FIG. 16 is a side generally cross-sectional view of a second preferred embodiment of a flashlight apparatus according to the present invention.

In the preferred embodiment of the flashlight 510, the tail cap assembly 512 includes an electrical component—such as the resistor 28 shown in the flashlight embodiments of FIGS. 1 and 22 or the inductor 100 shown in other embodiments such as in FIGS. 16 and 26—which may be placed alternatively in circuit and out of circuit with the battery 22 by a user's selective actuation of the switch assembly. The switch 514 includes a first ON position connected to the battery 22 (schematically represented in FIG. 2 by the dashed line contact 32 in contact with its switch contacts 36 while contact 34 is not in contact with contacts 38), and a second ON position connected to the battery 22 (schematically represented in FIG. 2 by the dashed line contact 34 in contact with its switch contacts 38 irrespective of whether contact 32 is in contact with contacts 36). When the switch 514 is in its first ON position, the resistor 28 (or inductor 100) is in series circuit with the battery 22; and when the switch 514 is in its second ON position, the resistor 28 (or inductor 100) is not in circuit with the battery 22.

The flashlight 510 is preferably provided with a controller 30 in circuit with the battery 22, the switch assembly 514 and the light emitter assembly 16. The controller 30 and its operation, with respect to the flashlight 510, is substantially the same as described above with respect to the flashlight 10.

Figure 32:
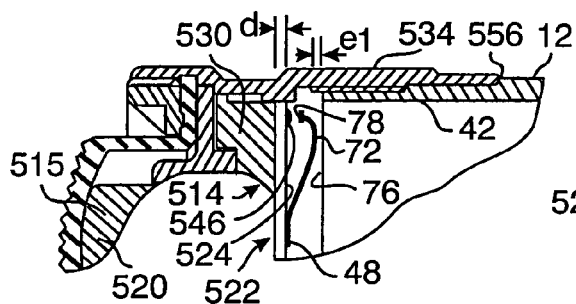
FIG. 32 shows a fragment of the flashlight of FIG. 28, generally within the area bounded by the dashed line B of FIG. 28 and in increased scale, representing the tail cap switch assembly of FIG. 28 in a first OFF position, the fragment being represented partially in cross-section and partially in side elevation.

The tail cap and switch assemblies 512, 514, 515 and their operation will be described in connection with FIGS. 29–37 in addition to FIGS. 2, 7 and 8. The tail cap assembly 512 includes an internally threaded rear cap or tail cap 534 threadedly engaging the externally threaded rear end portion 42 of the cylindrical battery housing 12. By such threaded engagement, the tail cap 534 may be rotated about the longitudinal axis a of the battery housing 12, such rotation causing translation or longitudinal displacement of the tail cap assembly 512 with respect to the battery housing 12. Such displacement permits the tail cap assembly 512 to be selectively positioned in three alternative locations where the switch 514 is in an OFF position. Such three locations are represented in FIGS. 32, 35 and 37.

Figure 5:
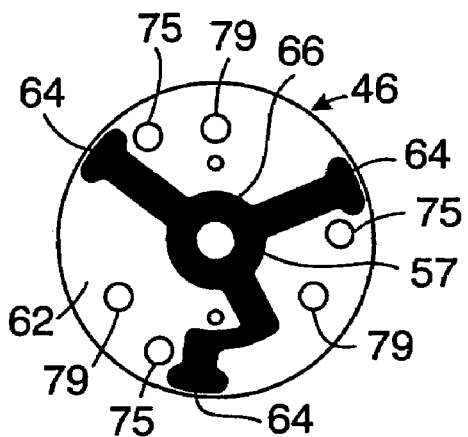
FIG. 5 is a view of the front face of the circuit board of FIG. 4.
Figure 6:
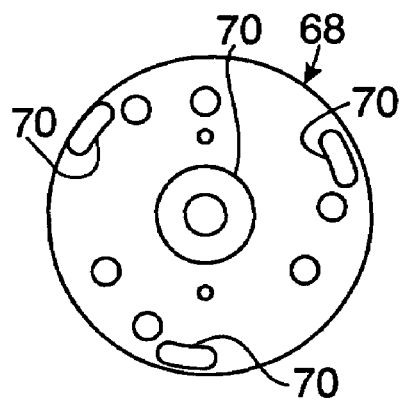
FIG. 6 is a front view of a solder mask applied to the circuit board front face shown in FIG. 5.

The circuit board 524 is functionally similar to the circuit board 46 of FIGS. 4–6. The structural differences between the two circuit boards, comprising an annular configuration and consequent printed circuit geometry and location of the resistor 28 for the circuit board 524, is for better accommodating the click-ON/click-OFF switch actuator 515. Specifically, the battery terminal contact spring 532 is secured to the spring retainer 528 by a conductive eyelet 536 which in turn conductively communicates (such as by a conductive wire) to a conductive portion 538 on the circuit board's rear face 540 (FIG. 29). One end of the resistor 28 is soldered to the conductive portion 540 and is thereby conductively connected to the eyelet 536 and hence to the battery terminal contact spring 532, while the other end of the resistor 28 is soldered to a conductive path 542 adjacent to the circumference of the circuit board's rear face 540.

The front face 544 (FIG. 30) of the circuit board 524 has printed thereon at least one and preferably three conductive pads 546 conductively extending to an annular conductive path 548 in conductive communication (such as by a conductive wire) with eyelet 536 and hence with the battery terminal contact spring 532. A non-conductive solder mask 550 (FIG. 31) is superimposed upon the circuit board's front face 544, the solder mask including apertures 552 therethrough corresponding to and exposing the conductive pads 546 on the circuit board's front face 544.

As previously described, the switch contact washer 48 (FIG. 7) comprises an annular conductive member with at least one and preferably three flexible resilient arcuate arms 72 along the washer's periphery and projecting from the washer base portion 74 along a forwardly acute angle (FIG. 8). Similarly to FIG. 9, the contact washer 48 is secured to the front face of the circuit board 524 and is in conductive engagement with the conductive path 542 on the circuit board's rear face 540, such as by washer tabs 73 extending from the washer base portion 74 and through respective apertures 554 in the circuit board 524, and soldered to the conductive path 542. The spring retainer 528 is fixedly secured to the circuit board retainer 530, with the inner edge portion of the circuit board 524 and the contact washer base portion 74 sandwiched therebetween.

The diameter of the contact washer 48 and the projection profile of each of the arms 72 are such that, when the switch 514 is in either one of two OFF positions, the arms 72 may be brought into conductive contact with the conductive rear edge 76 of the battery housing 12 when the circuit board assembly 522 is forwardly displaced by depression of the pushbutton 520; and when the switch has been placed in one but not the other of these two OFF positions, further forward displacement of the circuit board assembly 522 from the first ON position causes the conductive pads 546 to come into conductive contact with the respective end portion 78 of the resilient arms 72. The extent of forward displacement of the circuit board assembly 522 corresponds to the extent of depression of the pushbutton 520 less than full travel, for effecting the first and second momentary-ON positions from the first OFF position of the switch, and for effecting the first momentary-ON position only from the second OFF position of the switch. In addition, by depressing the pushbutton 520 to its full travel and release thereof, the switch may be placed in its second constant-ON position from its first OFF position only, and in its first constant-ON position from its second OFF position only.

Further, when the switch is in a third OFF position, depression of the pushbutton 520—even to its full travel—will not cause the switch to assume either of its first or second ON positions, so that the switch 514 is disabled in such third OFF position.

When the switch is in any one of its OFF positions (FIGS. 32, 35 and 37), the rear end portion 78 of each of the resilient conductive arms 72 are separated from their respective conductive pads 546 by a longitudinal separation d corresponding to a longitudinal depression of the pushbutton 520 by a distance less than full travel of the pushbutton 520. The longitudinal separation e between the forward edges of the arms 72 and the conductive rear edge 76 of the battery housing 12 is different in each configuration of the first, second and third OFF positions. In the embodiment shown in FIGS. 32–37, the separation e in the first OFF position of FIG. 32 corresponds to substantially less than full travel of the pushbutton 520, and the sum of the distances d and e corresponds to longitudinal depression of the pushbutton 520 by a distance just less than full travel of the pushbutton. In the second OFF position shown in FIG. 35, the separation e corresponds to depression of the pushbutton 520 by a distance just less; than full travel, and the sum of the separations d and e corresponds to a distance greater than full travel of the pushbutton 520. In the third OFF position shown in FIG. 37, the distance $e_3$ corresponds to a distance greater than full travel of the pushbutton 520. For convenience of description, the spring retainer 528 and spring 532 of the switch 514 are not shown in FIGS. 32–37.

Specifically, FIG. 32 shows the tail cap switch 514 in its first OFF position, wherein the tail cap 534 is threaded onto the rear threaded portion of the battery housing 12 such as to a stop 556 on the housing 12. At this first OFF position, the contact washer arms 72 are not in contact engagement with the rear edge 76 of the conductive battery housing 12 but are separated therefrom by the separation or distance $e_1$ corresponding to depression of the pushbutton 520 by a first distance substantially less than full travel of the pushbutton 520, and the sum of the longitudinal distances d and $e_1$ corresponds to a longitudinal depression of the pushbutton 520 by a second distance just less than full travel of the pushbutton.

Figure 33:
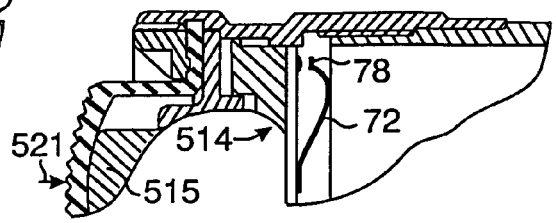
FIG. 33 is a fragmentary representation similar to FIG. 32, showing the tail cap switch assembly in a pushbutton-actuated first ON position.

When the pushbutton 520 is urged (represented by the force arrow 521, FIG. 33) for depressing the pushbutton by at least the first distance (but less than full travel), the circuit board assembly 522 (represented by the combined circuit board retainer 530, circuit board 524 and contact washer 48) is forwardly displaced away from the switch body member 517 such that the arms 72 are brought into conductive contact with the conductive rear edge of the battery housing 12, as shown in FIG. 33, resulting in the switch being momentarily in the first ON position, i.e. the switch is in a first momentary-ON position wherein the first ON position is maintained for as long as the pushbutton 520 remains depressed, and wherein release of the pushbutton 520 causes the circuit board assembly 522 to be rearwardly displaced by the bias of the battery terminal contact spring 532 returning the switch to the first OFF position of FIG. 32.

Figure 34:
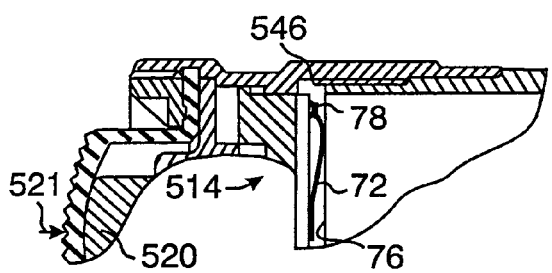
FIG. 34 is a fragmentary representation similar to FIG. 32, showing the tail cap switch assembly in a pushbutton-actuated second ON position.
Figure 35:
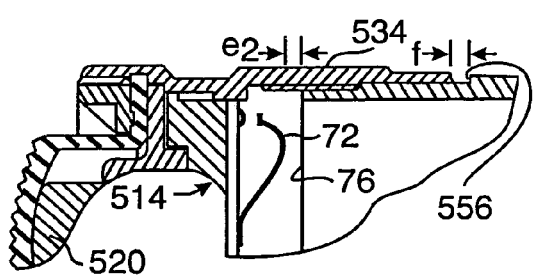
FIG. 35 is a fragmentary representation similar to FIG. 32, showing the tail cap switch assembly translated to a second OFF position.

Rather than returning the switch to its first OFF position, the user may further depress the pushbutton 520 to at least the cumulative second distance (still less than full travel of the pushbutton 520) corresponding to forward displacement of the circuit board assembly 522 until—with the contact washer arm 72 remaining in contact engagement with the battery housing rear edge 76—the circuit board conductive pads 546 contact the rearward end portions 78 of the contact washer arm 72 respectively, as shown in FIG. 34, resulting in the switch being momentarily in the second ON position. As long as the pushbutton 520 is so depressed, the switch 514 is maintained in this second momentary-ON position. The user's partial release of the pushbutton 520 results in rearward displacement of the circuit board assembly 522 by the rearward bias of the battery terminal's contact spring 532, returning the switch to its first momentary-ON position shown in FIG. 33; complete release returns the switch to its first OFF position shown in FIG. 32.

Rather than replacing the switch to its first momentary-ON position or to its first OFF position, the user may further depress the pushbutton 520 to its full travel, whereupon a click-ON operation of the switch button actuator 515 is effected. Upon the user's release of pushbutton urging, the circuit board assembly 522 is slightly rearwardly displaced to a rest position still in its second ON position, by the click-ON action of the actuator 515, so that the switch is maintained in its second ON position shown in FIG. 34, i.e. in a second constant-ON position. The next succeeding depression of the pushbutton 520 to its full travel and release effects a click-OFF operation of the pushbutton switch actuator 515, resulting in release of the circuit board assembly 522 and its return to the first OFF position shown in FIG. 32.

FIG. 35 shows the tail cap switch 514 in its second OFF position, wherein the tail cap 534 has been longitudinally rearwardly translated by being unthreadedly rotated with respect to the battery housing 12 from the stop 556 by a longitudinal distance f for increasing the separation e between the contact washer arms 72 and the rear edge 76 of the conductive battery housing 12. In this second OFF position, the separation $e_2$ between the contact washer arms 72 and the rear edge 76 of the conductive battery housing 12 is approximately equal to the sum of the distances $e_2$ and f, and corresponds to depression-of the pushbutton 520 by a third distance just less than full travel of the pushbutton 520, and wherein the sum of the longitudinal distances d and $e_2$ corresponds to a distance greater than full travel of the pushbutton 520.

Accordingly, when the tail cap switch is in this second OFF position, the resilient conductive arms 72 contact the rear conductive edge 76 of the battery housing 42 when the pushbutton is depressed a distance corresponding to at least the distance $e_2$ but less than pushbutton full travel, placing the switch in its first momentary-ON position. This first ON position is maintained for as long as the pushbutton 520 remains depressed, and release of the pushbutton 520 causes the circuit board assembly 522 to be rearwardly displaced by the bias of the battery terminal contact spring 532 returning the switch to the second OFF position of FIG. 35. It may be recognized that, when the pushbutton is depressed for maintaining the first momentary-ON position, further depression of the pushbutton 520 (even to full travel) would not forwardly move the circuit board assembly 522 sufficiently to cause contact engagement of the pads 542 with the respective end portions 78 of the arms 72, i.e. placing the switch in the second ON position is precluded from its second OFF position.

Rather than returning the switch to its second OFF position, the user may further depress the pushbutton 520 to its full travel, whereupon the click-ON operation of the pushbutton actuator 515 is effected. Upon the user's release of pushbutton urging, the circuit board assembly 522 is slightly rearwardly displaced to a rest position still in its first ON position, by the click-ON action of the actuator 515, so that the switch is maintained in its first ON position shown in FIG. 36, i.e. in a first constant-ON position. The next succeeding depression of the pushbutton 520 to its full travel and release effects a click-OFF operation of the pushbutton switch actuator 515, resulting in release of the circuit board assembly 522 and its return (through bias of the battery terminal spring 532) to the second OFF position shown in FIG. 35.

Figure 36:
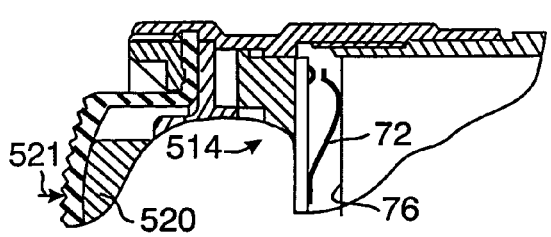
FIG. 36 is a fragmentary representation similar to FIG. 35, showing the tail cap switch assembly in the pushbutton-actuated first ON position.
Figure 37:
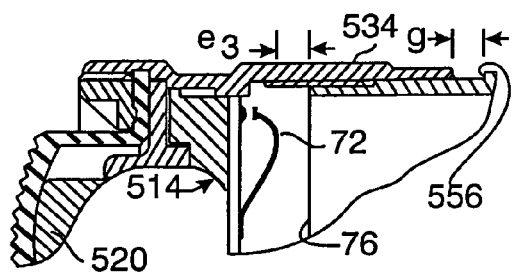
FIG. 37 is a fragmentary representation similar to FIG. 32, showing the tail cap switch assembly translated to a third OFF or lock-out position.

When the tail cap switch 514 is in its first ON position shown in FIG. 33 or FIG. 36, the contact engagement between the contact washer 48 and the conductive battery housing 12 completes the circuit of FIG. 2 with the resistor 28 (or inductor 100) in circuit between the battery 22 and the load. When the switch 514 is in its second ON position shown in FIG. 34, the resistor 28 (or inductor 100) is shorted out of the circuit, and the battery 22 is connected directly to the load.

The third OFF or lockout position is shown in FIG. 37, where the tail cap 534 has been rearwardly translated by unthreading with respect to the battery housing 12 by a distance g, such that the separation $e_3$ (approximately equal to the sum of the distances $e_1$ and g) between the arms 72 and the rear edge 76 of the battery housing 12 corresponds to a distance greater than full travel of the pushbutton 520. Accordingly, full travel of the pushbutton 520 will not displace the circuit board assembly 522 sufficiently for causing the conductive arms 72 to contact the conductive rear edge 76 of the battery housing 12, precluding the switch from effecting either one of the first and second ON positions upon any depression of the pushbutton 520.

Thus, there have been described preferred embodiments of flashlights with user-selectable actuation, preferably through a pushbutton tail switch, of different brightness levels of the light emitter assembly's light output. Momentary-ON and constant-ON actuation of the different brightness levels may be implemented by utilizing a click-ON/click-OFF pushbutton switch actuator in such flashlights. Other embodiments of the present invention, and variations of the embodiments described herein, may be developed without departing from the essential characteristics thereof. Accordingly, the invention should be limited only by the scope of the claims listed below.

We claim:

1. In a flashlight, the combination comprising:
    a battery;
    a light emitter assembly;
    a switch in circuit with said battery and said light emitter assembly, said switch having a first OFF position and a second OFF position, a first ON position coupling said battery to said light emitter assembly for producing a first light output, and a second ON position coupling said battery to said light emitter assembly for producing a second light output; and
    a switch actuator adapted to be coupled to said switch alternatively in said first OFF position and said second OFF position,
    said switch actuator, when coupled to said switch in said first OFF position, translatable by a first distance placing said switch in said first ON position and translatable by a second distance placing said switch in said second ON position,
    said switch actuator, when coupled to said switch in said second OFF position, translatable by a third distance placing said switch in said first ON position.

2. The flashlight according to claim 1, wherein:
    said switch has a third OFF position; and
    said switch actuator is adapted to be coupled to said switch in said third OFF position wherein actuation of said switch actuator is ineffective for placing said switch in either of said first and second ON positions.

3. The flashlight according to claim 1, wherein:
    said switch actuator includes a pushbutton depressible by said first, second and third distances for respectively placing said switch in said first ON, second ON and first ON positions.

4. The flashlight according to claim 3, wherein:
    said switch actuator comprises a click-ON/click-OFF pushbutton switch actuator for maintaining said switch in said second ON position when said switch actuator is coupled to said switch in said first OFF position and said pushbutton is depressed to its full travel and released.

5. The flashlight according to claim 4, wherein:
said click-ON/click-OFF pushbutton switch actuator maintains said switch in said first ON position when said switch actuator is coupled to said switch in said second OFF position and said pushbutton is depressed to its full travel and released.

6. The flashlight according to claim 1, wherein:
said switch includes an electrical component in circuit with said battery when said switch is in one of said first and second ON positions, said electrical component not in circuit with said battery when said switch is in the other of said first and second ON positions; and
said light emitter assembly is responsive to whether or not said electrical component is in circuit with said battery for producing said first light output when said electrical component is in circuit with said battery and for producing said second light output when said electrical component is not in circuit with said battery.

7. The flashlight according to claim 6, wherein:
said electrical component is in circuit with said battery when said switch is in said first ON position and is shorted out of said circuit when said switch is in said second ON position.

8. The flashlight according to claim 6, wherein:
said electrical component comprises a resistor.

9. The flashlight according to claim 6, wherein:
said electrical component comprises an inductor.

10. The flashlight according to claim 1, wherein:
said switch includes an electrical component in circuit with said battery when said switch is in one of said first and second ON positions, said electrical component not in circuit with said battery when said switch is in the other of said first and second ON positions; and
a controller in circuit with said battery, said switch and said light emitter assembly, for detecting whether or not said electrical component is in circuit with said battery when said switch is in either one of said first ON position and said second ON position, and for controlling electrical power to said light emitter assembly for producing said first light output when said electrical component is detected and for producing said second light output when said electrical component is not detected.

11. The flashlight according to claim 10, wherein:
said electrical component is in circuit with said battery when said switch is in said first ON position and is shorted out of said circuit when said switch is in said second ON position.

12. The flashlight according to claim 10, wherein:
said electrical component comprises a resistor.

13. The flashlight according to claim 10, wherein:
said electrical component comprises an inductor.

14. In a flashlight, the combination comprising:
a battery;
a light emitter assembly;
a switch in circuit with said battery and said light emitter assembly, said switch having a first OFF position, a first ON position coupling said battery to said light emitter assembly for producing a first light output, and a second ON position coupling said battery to said light emitter assembly for producing a second light output; and
a click-ON/click-OFF pushbutton switch actuator including a pushbutton, said switch actuator adapted to be coupled to said switch in said first OFF position wherein said pushbutton is depressible by a first distance placing said switch momentarily in said first ON position, said pushbutton is depressible by a second distance placing said switch momentarily in said second ON position, said pushbutton is depressible to its full travel and releasable for maintaining said switch in said second ON position, said switch actuator is adapted for releasing said switch to said first OFF position when said switch is in the maintained second ON position and said pushbutton is depressed to its full travel and released.

15. The flashlight according to claim 14, including:
a battery housing for said battery; and
a tail cap assembly including said switch and said switch actuator, said tail cap assembly being translatable along said battery housing for placing said switch in said first OFF position.

16. The flashlight according to claim 14 wherein:
said switch has a second OFF position; and
said switch actuator is adapted to be coupled to said switch in said second OFF position wherein said pushbutton is depressible by a third distance placing said switch momentarily in said first ON position, said pushbutton is depressible to its full travel and releasable for maintaining said switch in said first ON position, said switch actuator is adapted for releasing said switch to said second OFF position when said switch is in the maintained first ON position and said pushbutton is depressed to its full travel and released.

17. The flashlight according to claim 16, including:
a battery housing for said battery; and
a tail cap assembly including said switch and said switch actuator, said tail cap assembly translatable along said battery housing for placing said switch in said first OFF position and alternatively in said second OFF position.

18. The flashlight according to claim 16, wherein:
said switch has a third OFF position; and
said switch actuator is adapted to be coupled to said switch in said third OFF position wherein depression of said pushbutton is ineffective for placing said switch in either of said first and second ON positions.

19. The flashlight according to claim 18, including:
a battery housing for said battery; and
a tail cap assembly including said switch and said switch actuator, said tail cap assembly translatable along said battery housing for placing said switch alternatively in said first OFF position, said second OFF position and said third OFF position.

20. The flashlight according to claim 14, wherein:
said switch includes an electrical component in circuit with said battery when said switch is in one of said first and second ON positions, said electrical component not in circuit with said battery when said switch is in the other of said first and second ON positions; and
said light emitter assembly is responsive to whether or not said electrical component is in circuit with said battery for producing said first light output when said electrical component is in circuit with said battery and for producing said second light output when said electrical component is not in circuit with said battery.

21. The flashlight according to claim 20, wherein:
said electrical component is in circuit with said battery when said switch is in said first ON position and is shorted out of said circuit when said switch is in said second ON position.

22. The flashlight according to claim 20, wherein:
said electrical component comprises a resistor.

23. The flashlight according to claim 20, wherein:
said electrical component comprises an inductor.

24. The flashlight according to claim 20, including:
a battery housing for said battery, said battery housing having a rear end; and
a tail cap assembly coupled to said battery housing at said rear end, said tail cap assembly including said switch and said switch actuator.

25. The flashlight according to claim 24, wherein:
said rear end of said battery housing includes an electrically conductive rear edge; and
said switch includes a contact member coupled through said electrical component to a terminal of said battery in said battery housing, said contact member including at least one resilient arm spaced from said conductive rear edge of said battery housing when said switch is in said first OFF position, said at least one resilient arm in conductive contact with said conductive rear edge when said switch is in said first ON position, said at least one resilient arm in conductive contact with said conductive rear edge and with said terminal of said battery shorting out said electrical component when said switch is in said second ON position.

26. The flashlight according to claim 24, wherein:
said tail cap assembly is threadedly rotatable along said rear end of said battery housing for placing said switch in said first OFF position.

27. The flashlight according to claim 14, including:
an electrical component in circuit with said battery when said switch is in said first ON position, said electrical component not in circuit with said battery when said switch is in said second ON position; and
a controller in circuit with said battery, said switch and said light emitter assembly, for detecting whether or not said electrical component is in circuit with said battery when said switch is in either one of said first ON position and said second ON position, and for controlling electrical power to said emitter assembly for producing a first light output when said electrical component is detected and for producing a second light output when said electrical component is not detected.

28. The flashlight according to claim 27, wherein:
said electrical component is in circuit with said battery when said switch is in said first ON position and is shorted out of said circuit when said switch is in said second ON position.

29. The flashlight according to claim 27, wherein:
said electrical component comprises a resistor.

30. The flashlight according to claim 27, wherein:
said electrical component comprises an inductor.

31. The flashlight according to claim 27, including:
a battery housing for said battery, said battery housing having a rear end; and
a tail cap assembly coupled to said battery housing at said rear end, said tail cap assembly including said switch and said switch actuator.

32. The flashlight according to claim 31, wherein:
said rear end of said battery housing includes an electrically conductive rear edge; and
said switch includes a contact member coupled through said electrical component to a terminal of said battery in said battery housing, said contact member including at least one resilient arm spaced from said conductive rear edge of said battery housing when said switch is in said first OFF position, said at least one resilient arm in conductive contact with said conductive rear edge when said switch is in said first ON position, said at least one resilient arm in conductive contact with said conductive rear edge and with said terminal of said battery shorting out said electrical component when said switch is in said second ON position.

33. The flashlight according to claim 31, wherein:
said tail cap assembly is threadedly rotatable along said rear end of said battery housing for placing said switch in said first OFF position.

34. The flashlight according to claim 16, wherein:
said switch includes an electrical component in circuit with said battery when said switch is in one of said first and second ON positions, said electrical component not in circuit with said battery when said switch is in the other of said first and second ON positions; and
said light emitter assembly is responsive to whether or not said electrical component is in circuit with said battery for producing said first light output when said electrical component is in circuit with said battery and for producing said second light output when said electrical component is not in circuit with said battery.

35. The flashlight according to claim 34, wherein:
said electrical component is in circuit with said battery when said switch is in said first ON position and is shorted out of said circuit when said switch is in said second ON position.

36. The flashlight according to claim 34, wherein:
said electrical component comprises a resistor.

37. The flashlight according to claim 34, wherein:
said electrical component comprises an inductor.

38. The flashlight according to claim 34, including:
a battery housing for said battery, said battery housing having a rear end; and
a tail cap assembly coupled to said battery housing at said rear end, said tail cap assembly including said switch and said switch actuator.

39. The flashlight according to claim 38, wherein:
said rear end of said battery housing includes an electrically conductive rear edge; and
said switch includes a contact member coupled through said electrical component to a terminal of said battery in said battery housing, said contact member including at least one resilient arm spaced from said conductive rear edge of said battery housing when said switch is in said first and second OFF positions, said at least one resilient arm in conductive contact with said conductive rear edge when said switch is in said first ON position, said at least one resilient arm in conductive contact with said conductive rear edge and with said terminal of said battery shorting out said electrical component when said switch is in said second ON position.

40. The flashlight according to claim 38, wherein:
said tail cap assembly is threadedly rotatable along said rear end of said battery housing for placing said switch in said first OFF position and alternatively in said second OFF position.

41. The flashlight according to claim 38, wherein:
said switch has a third OFF position; and
said switch actuator is adapted to be coupled to said switch in said third OFF position wherein depression of said pushbutton is ineffective for placing said switch in either of said first and second ON positions.

42. The flashlight according to claim 41, wherein:
said tail cap assembly is threadedly rotatable along said rear end of said battery housing for placing said switch alternatively in said first OFF position, said second OFF position and said third OFF position.

43. The flashlight according to claim 16, including:
an electrical component in circuit with said battery when said switch is in said first ON position, said electrical component not in circuit with said battery when said switch is in said second ON position; and a controller in circuit with said battery, said switch and said light emitter assembly, for detecting whether or not said electrical component is in circuit with said battery when said switch is in either one of said first ON position and said second ON position, and for controlling electrical power to said emitter assembly for producing a first light output when said electrical component is detected and for producing a second light output when said electrical component is not detected.

44. The flashlight according to claim 43, wherein:

said electrical component is in circuit with said battery when said switch is in said first ON position and is shorted out of said circuit when said switch is in said second ON position.

45. The flashlight according to claim 43, wherein:

said electrical component comprises a resistor.

46. The flashlight according to claim 43, wherein:

said electrical component comprises an inductor.

47. The flashlight according to claim 43, including:

a battery housing for said battery, said battery housing having a rear end; and a tail cap assembly coupled to said battery housing at said rear end, said tail cap assembly including said switch and said switch actuator.

48. The flashlight according to claim 47, wherein:

said rear end of said battery housing includes an electrically conductive rear edge; and said switch includes a contact member coupled through said electrical component to a terminal of said battery in said battery housing, said contact member including at least one resilient arm spaced from said conductive rear edge of said battery housing when said switch is in said first OFF position, said at least one resilient arm in conductive contact with said conductive rear edge when said switch is in said first ON position, said at least one resilient arm in conductive contact with said conductive rear edge and with said terminal of said battery shorting out said electrical component when said switch is in said second ON position.

49. The flashlight according to claim 47, wherein:

said tail cap assembly is threadedly rotatable along said rear end of said battery housing for placing said switch in said first OFF position and alternatively in said second OFF position.

50. The flashlight according to claim 47, wherein:

said switch has a third OFF position; and said switch actuator is adapted to be coupled to said switch in said third OFF position wherein depression of said pushbutton is ineffective for placing said switch in either of said first and second ON positions.

51. The flashlight according to claim 50, wherein:

said tail cap assembly is threadedly rotatable along said rear end of said battery housing for placing said switch alternatively in said first OFF position, said second OFF position and said third OFF position.

* * * * *

UNITED STATES PATENT AND TRADEMARK OFFICE
CERTIFICATE OF CORRECTION

PATENT NO. : 7,116,061 B2
APPLICATION NO. : 10/966426
DATED : October 3, 2006
INVENTOR(S) : Paul Y. Kim and William A. Hunt It is certified that error appears in the above-identified patent and that said Letters Patent is hereby corrected as shown below:

At column 14 lines 36-37, "www.cs.indiana.edu/¯willie" should be --www.cs.indiana.edu/~willie-- .

At column 18 line 8, "less; than" should be --less than-- .

At column 19 line 19, "$e_2$" should be --$e_1$-- .

At column 19 line 20, "depression-of" should be --depression of-- .

Signed and Sealed this

Twenty-sixth Day of December, 2006

JON W. DUDAS
*Director of the United States Patent and Trademark Office*